US012358112B2

(12) United States Patent
Moeller

(10) Patent No.: US 12,358,112 B2
(45) Date of Patent: Jul. 15, 2025

(54) FASTENER-DRIVING TOOL WITH CHAMBER MEMBER RETAINING ASSEMBLY

(71) Applicant: Illinois Tool Works Inc., Glenview, IL (US)

(72) Inventor: Larry Moeller, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/151,275

(22) Filed: Jan. 6, 2023

(65) Prior Publication Data

US 2023/0158653 A1 May 25, 2023

Related U.S. Application Data

(63) Continuation-in-part of application No. 17/687,154, filed on Mar. 4, 2022, now Pat. No. 11,794,323.

(60) Provisional application No. 63/159,696, filed on Mar. 11, 2021.

(51) Int. Cl.
*B25C 1/08* (2006.01)
*B25C 1/00* (2006.01)

(52) U.S. Cl.
CPC ................ *B25C 1/08* (2013.01); *B25C 1/008* (2013.01)

(58) Field of Classification Search
CPC .................................. B25C 1/08; B25C 1/008
USPC .................................................. 227/10, 8, 9
See application file for complete search history.

(56) References Cited

U.S. PATENT DOCUMENTS

| | | | |
|---|---|---|---|
| 6,123,241 | A | 9/2000 | Aparicio |
| 6,145,724 | A | 11/2000 | Shkolnikov et al. |
| 6,543,664 | B2 | 4/2003 | Wolfberg |
| 6,592,014 | B2 | 7/2003 | Smolinski |
| 6,705,501 | B2 | 3/2004 | Miller et al. |
| 6,755,159 | B1 | 6/2004 | Adams et al. |
| 6,783,045 | B2 | 8/2004 | Shima et al. |
| 6,889,885 | B2 | 5/2005 | Ohmori |
| 6,983,871 | B2 | 1/2006 | Shima et al. |
| 6,996,476 | B2 | 2/2006 | Najarian |
| 7,163,134 | B2 | 1/2007 | Moeller et al. |
| 7,182,236 | B1 | 2/2007 | Wen |
| 7,201,301 | B2 | 4/2007 | Moeller et al. |
| 7,383,974 | B2 | 6/2008 | Moeller et al. |
| 7,487,898 | B2 | 2/2009 | Moeller et al. |
| 8,070,031 | B2 | 12/2011 | Moeller et al. |
| 8,770,456 | B2 | 7/2014 | Moeller et al. |
| 9,486,906 | B2 | 11/2016 | Zhao et al. |
| 9,486,907 | B2 | 11/2016 | Birk |
| 11,141,845 | B2 | 10/2021 | Taylor et al. |

(Continued)

OTHER PUBLICATIONS

International Search Report and Written Opinion from International Application No. PCT/US2022/019505, mailed Jun. 21, 2022 (13 pages).

(Continued)

*Primary Examiner* — Veronica Martin
(74) *Attorney, Agent, or Firm* — Neal, Gerber & Eisenberg LLP

(57) ABSTRACT

A combustion-powered fastener-driving tool that include a chamber member retainer assembly configured to enable the controller of the tool to prevent the chamber member of the tool from moving to an open unsealed position and to ensure the tool's combustion chamber remains sealed until the piston fully returns to its pre-firing position.

6 Claims, 23 Drawing Sheets

(56) References Cited

U.S. PATENT DOCUMENTS

| | | | | |
|---|---|---|---|---|
| 2007/0121731 | A1* | 5/2007 | Tanizawa | H04N 19/61 375/E7.176 |
| 2007/0131731 | A1 | 6/2007 | Moeller et al. | |
| 2007/0215669 | A1 | 9/2007 | Lee | |
| 2008/0017689 | A1 | 1/2008 | Simonelli et al. | |
| 2008/0237295 | A1 | 10/2008 | Adams | |
| 2009/0152316 | A1 | 6/2009 | Moeller | |
| 2010/0065602 | A1 | 3/2010 | Zhao et al. | |
| 2010/0243699 | A1 | 9/2010 | Largo | |
| 2013/0299546 | A1* | 11/2013 | Zhao | B25C 1/008 227/8 |
| 2014/0069981 | A1 | 3/2014 | Ricordi et al. | |
| 2014/0197220 | A1 | 7/2014 | Birk | |
| 2014/0252060 | A1 | 9/2014 | Segura | |
| 2015/0102084 | A1 | 4/2015 | Zhao | |
| 2017/0232598 | A1 | 8/2017 | Largo et al. | |
| 2020/0119600 | A1* | 4/2020 | Inuzuka | H02K 7/145 |

OTHER PUBLICATIONS

Extended European Search Report from European Application No. 23218368.1, dated May 22, 2024 (7 pages).

* cited by examiner

FASTENER-DRIVING TOOL WITH CHAMBER MEMBER RETAINING ASSEMBLY

PRIORITY

This patent application is a continuation-in-part of and claims priority to and the benefit of U.S. patent application Ser. No. 17/687,154, filed Mar. 4, 2022, which claims priority to and the benefit of U.S. Provisional Patent Application Ser. No. 63/159,696, filed Mar. 11, 2021, the contents of which are incorporated herein by reference in their entirety.

BACKGROUND

The present disclosure relates to powered fastener-driving tools. Powered fastener-driving tools employ one of several different types of power sources to drive a fastener (such as a nail or a staple) into a workpiece. Powered fastener-driving tools use a power source to drive a piston carrying a driver blade through a cylinder from a pre-firing position to a firing position. As the piston moves to the firing position, the driver blade travels through a nosepiece that guides the driver blade to contact a fastener housed in the nosepiece of the tool. Continued movement of the piston through the cylinder toward the firing position forces the driver blade to drive the fastener out of the nosepiece and into the workpiece. The piston is then forced back to the pre-firing position in a way that depends on the tool's construction and the power source the tool employs. A fastener-advancing device of the tool forces another fastener from a magazine of the tool into the nosepiece, and the tool is ready to fire this next fastener.

Combustion-powered fastener-driving tools are one type of powered fastener-driving tool. A combustion-powered fastener-driving tool uses a small internal combustion assembly as its power source. For various known combustion-powered fastener-driving tools, when an operator depresses a workpiece-contact element ("WCE") of the tool onto a workpiece to move the WCE from an extended position to a retracted position, one or more mechanical linkages cause: (1) a chamber member to move to a sealed position to seal a combustion chamber that is in fluid communication with the cylinder; and (2) a fuel delivery system to dispense fuel from a fuel canister into the (now sealed) combustion chamber. When an operator pulls the trigger, the trigger actuates a trigger switch, thereby causing a spark plug to spark and ignite the fuel/air mixture in the combustion chamber. This generates high-pressure combustion gases that expand and force the piston to move through the cylinder from the pre-firing position to the firing position, thereby causing the driver blade to contact a fastener housed in the nosepiece and drive the fastener out of the nosepiece and into the workpiece. Just before the piston reaches the firing position, the piston passes exhaust check valves defined through the cylinder, and some of the combustion gases that propel the piston exhaust through the check valves to atmosphere. This combined with heat exchange to the atmosphere and the fact that the combustion chamber remains sealed during firing generates a vacuum pressure above the piston and causes the piston to retract to the pre-firing position. When the operator removes the WCE from the workpiece, a spring biases the WCE from the retracted position to the extended position, causing the one or more mechanical linkages to move the chamber member to an unsealed position to unseal the combustion chamber.

One issue with the operation of certain combustion-powered fastener-driving tools can occur if the chamber member moves and the combustion chamber unseals before the piston returns to the pre-firing position. For instance, if the operator removes the WCE from the workpiece after firing but before the piston returns to the pre-firing position, this can cause the chamber member to move to the unsealed position and unseal the combustion chamber. When this happens, at least some of the vacuum pressure can be lost. This can cause the piston to stop before reaching its pre-firing position, which in turn can cause the tool to not properly function the next time the operator attempts to use the tool to drive the next fastener.

Certain fastener-driving tools have two different types of operational modes and one or more mechanisms that enable the operator to optionally select one of the two different operational modes that the operator desires to use for driving the fasteners. One such operational mode is known in the industry as the sequential or single actuation operational mode. In this operational mode, the actuation of the trigger mechanism will not (by itself) initiate the actuation of the powered fastener driving tool (and the driving of a fastener into the workpiece) unless the WCE is sufficiently depressed against the workpiece. In other words, to operate the powered fastener driving tool in the sequential or single actuation operational mode, the WCE must first be depressed against the workpiece followed by the actuation of the trigger mechanism. Another operational mode is known in the industry as the contact actuation or bump-fire operational mode. In this operational mode, the operator can maintain the trigger mechanism at or in its actuated position, and subsequently, each time the WCE is in contact with and sufficiently pressed against the workpiece, the fastener-driving tool will actuate (thereby driving a fastener into the workpiece).

One issue with various commercially available combustion-powered fastener-driving tools (that are sometimes called cordless framing nailers) is that they operate in the sequential firing mode but do not operate in the bump fire mode. Operating such tools only in the sequential firing mode can lead to operator fatigue.

Accordingly, there is a need for combustion-powered fastener-driving tools that address these issues.

SUMMARY

The present disclosure provides various embodiments of a combustion-powered fastener-driving tool that address the above issues by including a chamber member retaining assembly to ensure the chamber member doesn't move to an unsealed position and the combustion chamber remains sealed until the piston fully returns to its pre-firing position. The chamber member retaining assembly is controlled by a suitable controller and engageable with the chamber member thereby providing the controller with the ability to prevent certain undesired movement of the chamber member from the sealed position.

In various embodiments, the chamber member retaining assembly includes an electromagnet that directly holds the chamber member in a retained position. The controller of the tool selectively energizes the electromagnet to maintain the chamber member in a retained position. The electromagnet directly selectively prevents the chamber member from moving toward its unsealed position from its sealed position. In various embodiments, the controller de-energizes the electromagnet after a designated amount of time (thereby allowing the chamber member to move to the unsealed position) to give the piston time to fully return to its pre-firing position. This enables the tool to operate in a bump fire mode. The operational rate can be limited by various factors including the requisite electromagnet "on" time and the time between fastener driving cycles while the tool is repositioned, and the combustion chamber receives fresh air. The combustion-powered fastener-driving tool of various embodiments of the present disclosure is able to thus able to provide an automatic combustion chamber lock control feature and a bump-fire mode feature.

Various embodiments of the combustion-powered fastener-driving tool of the present disclosure operate in a default sequential mode and responsive to the user switching modes operate in a bump-fire mode. In various embodiments, the controller of the tool employs a time-out function in the bump-fire mode that prevents tool operation in the bump-fire mode after a designated idle period (such as, for example, five to ten seconds). The combustion-powered fastener-driving tool of various embodiments of the present disclosure enables the operator to rapidly select between the sequential or single actuation operational mode and the contact actuation or bump-fire operational mode.

Additional features and advantages are described in, and will be apparent from, the following Detailed Description and the Figures.

DETAILED DESCRIPTION

Figure 1:
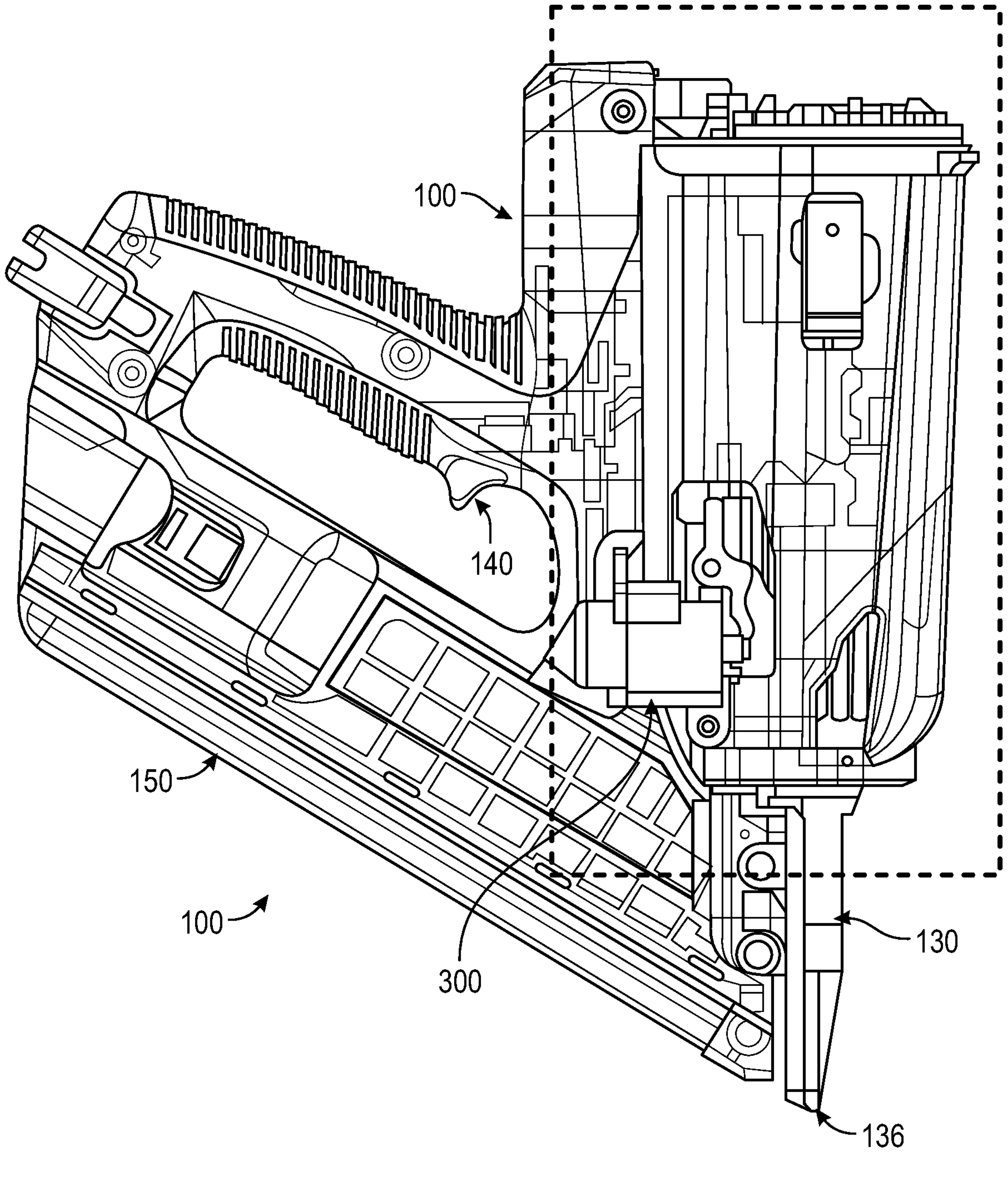
FIG. 1 is a perspective view of a combustion-powered fastener-driving tool of one example embodiment of the present disclosure.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Turning now to the figures, FIGS. 1 to 6C illustrate one example embodiment of a combustion-powered fastener-driving tool 100 of the present disclosure (sometimes called the "tool" for brevity). The tool 100 generally includes a multi-piece housing 110, a nosepiece assembly 130 including a workpiece-contact element 136 supported by the housing 110, a trigger assembly 140 supported by the housing 110, a fastener magazine 150 supported by the housing 110 and connected to the nosepiece assembly 130, an internal combustion assembly 200 at least partially within the housing 110, and a chamber member retaining assembly 300 supported by the housing 110. Since certain portions of the fastener-driving tool 100 such as the housing 110, the nosepiece assembly 130, the workpiece-contact element 126, the fuel delivery system (not shown), and the fastener magazine 150 are well-known in the art, they are only partially shown in certain drawings and are not described herein for brevity.

The internal combustion assembly 200 of the tool 100 includes: (1) a cylinder 210 at least partially within and supported by the housing 110; (2) a piston 220 slidably disposed within the cylinder 210; (3) a driver blade 230 attached to and extending below the piston 220; and (4) a bumper 240 positioned within and at the bottom of the cylinder 210. The piston 220 attached to the driver blade 230 is movable relative to the cylinder 210 between a pre-firing position and a firing position. The cylinder 210 includes an exhaust check or petal valve (not shown) near its bottom and defines a vent port 252 below the exhaust check valve. The exhaust check valve 250 and the vent port 252 fluidically connect the cylinder 210 with the atmosphere.

A chamber member (which is sometimes called a valve sleeve in the art) 260 is at least partially within, supported by, and movable relative to the housing 110. The chamber member or valve sleeve 260 partially surrounds the cylinder 210. The chamber member or valve sleeve 260 is movable relative to the housing 110, the cylinder head 212, and the cylinder 210 (among other components) between an unsealed position and a sealed position. The chamber member or valve sleeve 260, the cylinder head 212, the cylinder 210, and the piston 220 collectively define a combustion chamber (not labeled). When the chamber member or valve sleeve 260 is in the sealed position, the combustion chamber is sealed. Conversely, when the chamber member or valve sleeve 260 is in the unsealed position, the combustion chamber is unsealed.

A suitable linkage (not shown) connects the chamber member or valve sleeve 260 and the workpiece-contact element 136. The workpiece-contact element 136 is movable relative to the housing 110, the cylinder head 212, and the cylinder 210 (among other elements) between an extended position and a retracted position. A biasing element (not shown), such as a spring, biases the workpiece contact element 136 to the extended position. Movement of the workpiece-contact element 136 from the extended position to the retracted position causes the chamber member or valve sleeve 260 (via the linkage) to move from the unsealed position (see FIGS. 2A and 2B) to the sealed position (see FIGS. 3A, 3B, 4A, 4B, 5A, 5B, 6A, and 6B), and vice-versa.

In this example embodiment, the chamber member retaining assembly 300 of the tool 100 generally includes a housing 310, a gas assisted actuation member 330 positioned in the housing 310, and an electromagnet 360 positioned in the housing 310 and configured to hold the actuation member 330 in a retained position under control of the controller (not shown) of the tool 100. The actuation member 330 includes an actuation pin 334 and an actuation plunger 338 connected to the distal end of the actuation pin 334. The tool 100 provides gas that causes the actuation member 330 to move from an unretained position toward (FIGS. 2C, 2D, and 3C) and to a retained position (FIGS. 4C, 5C and 6C). The controller of the tool 100 is configured to selectively energize the electromagnet 360 to maintain the actuation member 330 in the retained position (FIGS. 5C and 6C). The actuation member 330 in turn causes a chamber member engagement lever 400 to prevent the chamber member 260 from moving toward its unsealed position from its sealed position. The controller energizes the electromagnet 360 for a designated amount of time (such as 100 to 160 milli-seconds) to give the piston 220 time to fully return to its pre-firing position before allowing the chamber member 260 to move to its unsealed position. Thus, in this example embodiment, the chamber member retaining assembly 300 ensures that the chamber member 260 does not move to an unsealed position and the combustion chamber remains sealed until the piston 220 fully returns to the pre-firing position. This partly enables the tool 100 to operate in a bump fire mode.

In this example embodiment, the chamber member engagement lever 400 includes an upper arm 410, a central pivot member 430, and a lower arm 450. The upper arm 410 is connected to the central pivot member 430 and extends upwardly from the central pivot member 430. The upper arm 410 includes a chamber member engagement hand 415 configured to engage the chamber member 260 to prevent the movement of the chamber member 260 to the unsealed position. The lower arm 450 is connected to the central pivot member 430 and extends downwardly from the central pivot member 430. The lower arm 450 includes a connection hand 455 that facilitates a pivotal connection to actuation member 330. The central pivot member 430 is pivotally attached to a lever support 490 attached to the housing 310 by a pivot pin 435. The upper arm 410, the central pivot member 430, and the lower arm 450 of the chamber member engagement lever 400 are thus pivotally connected to the actuation member 330 and the movement of the chamber member engagement lever 400 is thus controlled by the actuation member 330 and the chamber member retaining assembly 300 under control of the controller of the tool 100. It should be appreciated that the pivot point for the chamber member engagement lever can vary in accordance with the present disclosure. It should also be appreciated that the configuration (including the shape and/or size) of the chamber member engagement lever (including the upper arm, the central pivot member, and/or the lower arm) can vary in accordance with the present disclosure.

Figure 2B:
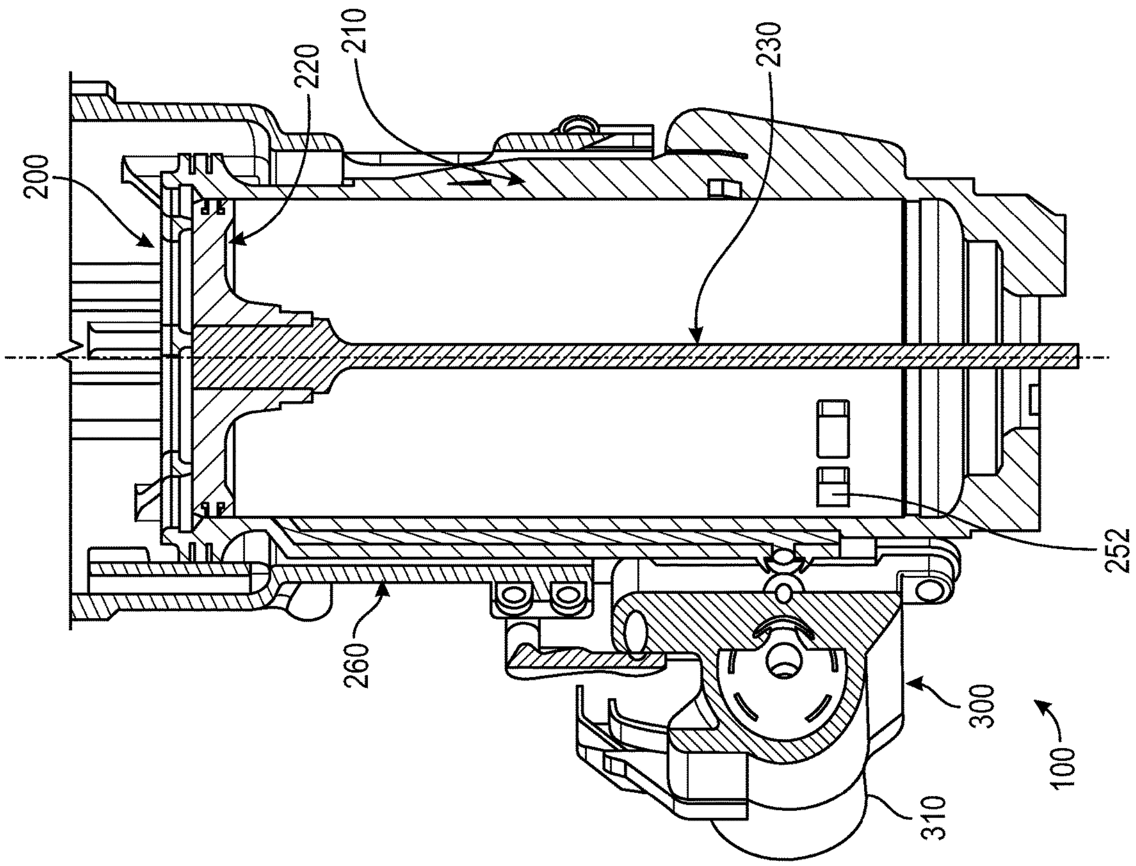
FIGS. 2A, 2B, 2C, and 2D are fragmentary partial cross-sectional views of the fastener-driving tool of FIG. 1 in a rest state with the chamber member in an unsealed position, the piston in a fully retracted position, and the chamber member retaining assembly in an inactive state.
Figure 2A:
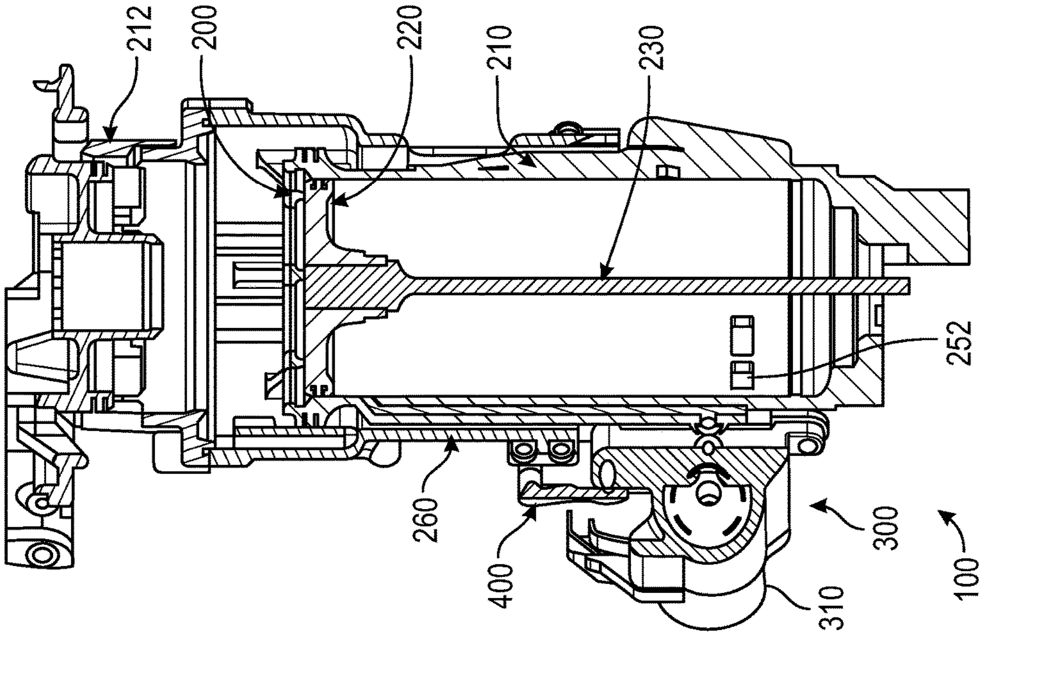
Figure 2C:
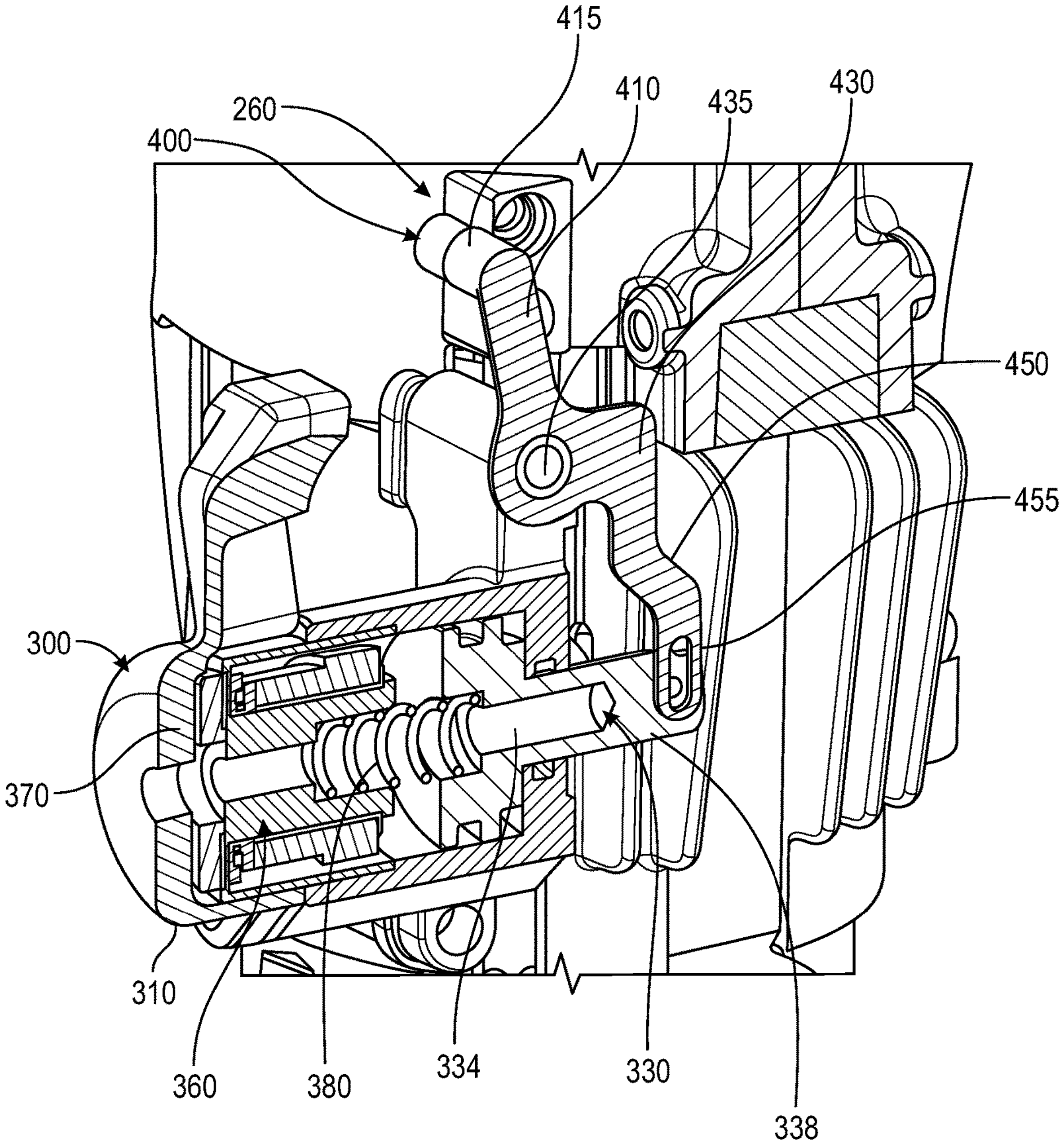
Figure 2D:
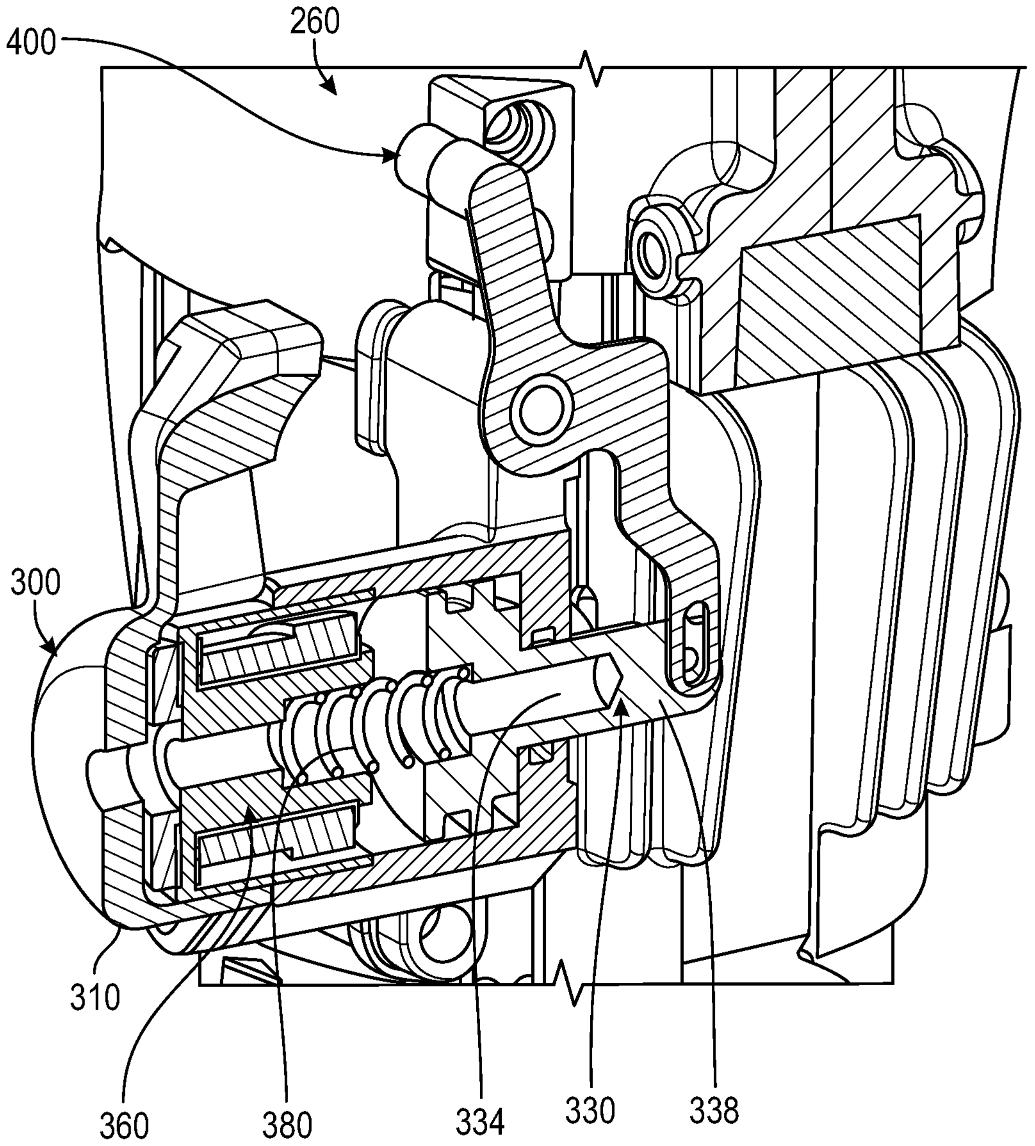

FIGS. 2A, 2B, 2C, and 2D show the tool 100 in a rest state with the chamber member 260 in an unsealed position, the piston 220 in a fully retracted position, and the chamber member retaining assembly 300 in an inactive state. In this example embodiment, the chamber member retaining assembly 300 includes a rubber bumper 370 that provides damping behind the electromagnet 360. This allows for an amount of compression due to the gas pressure on the actuation member 330, allows for adjustment of the stroke of the actuation member 330, and allows for accommodations of material thickness of the housing 310 of the chamber member retaining assembly 300. In this example embodiment, the chamber member retaining assembly 300 includes a biasing member such as spring 380 biases the actuation member 330 to the unretained position as shown in FIGS. 2C and 2D.

Figure 3B:
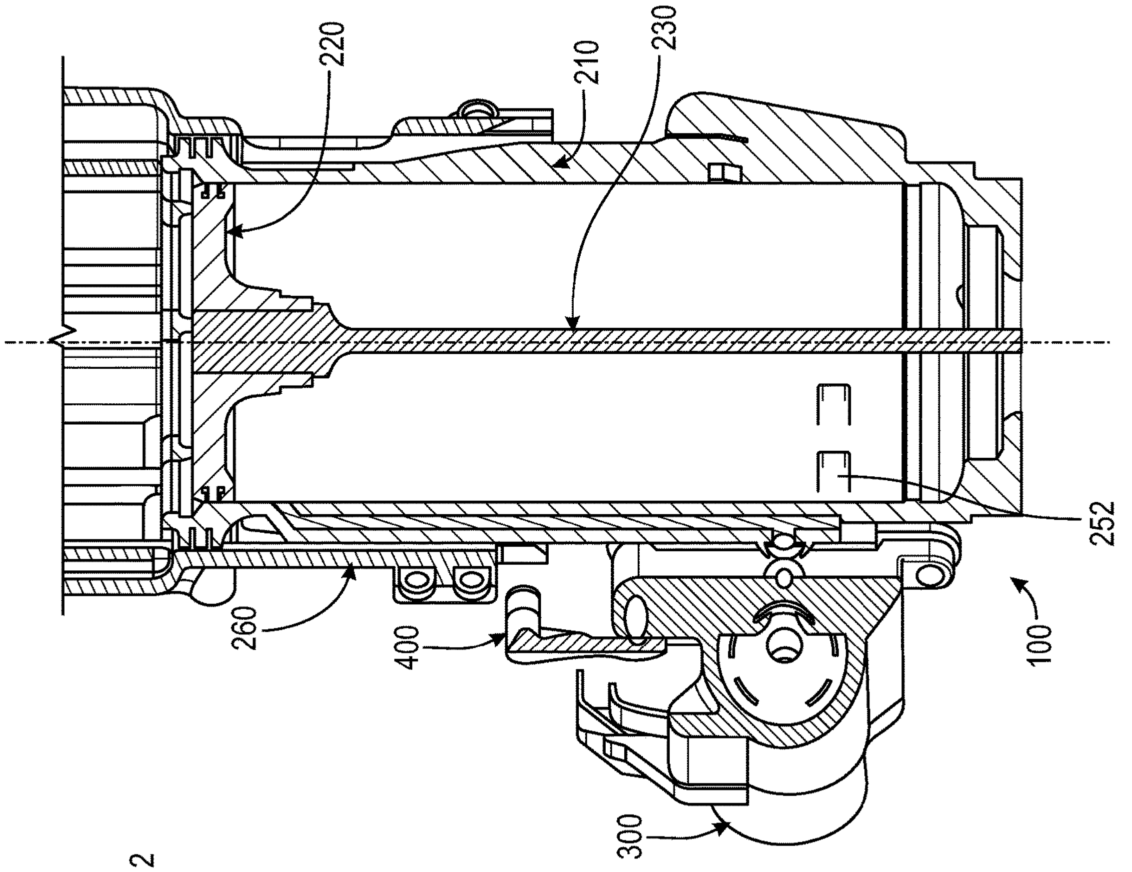
FIGS. 3A, 3B, and 3C are fragmentary partial cross-sectional views of the fastener-driving tool of FIG. 1 in a ready to fire state with the chamber member in a sealed position, the piston in a fully retracted position, and the chamber member retaining member in an inactive state.
Figure 3A:
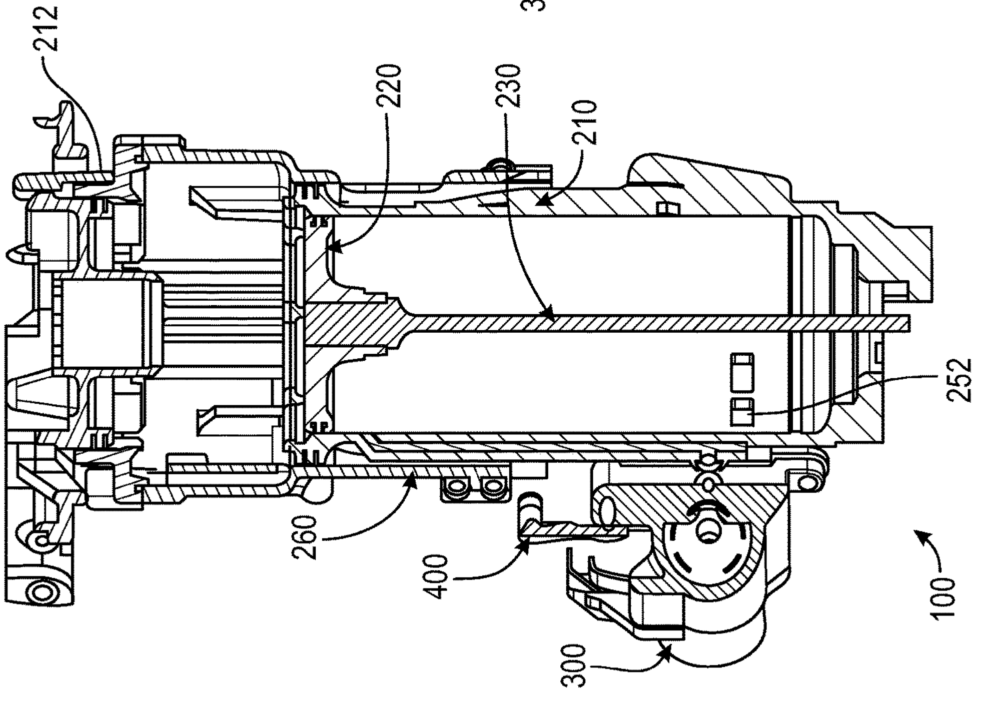
Figure 3C:
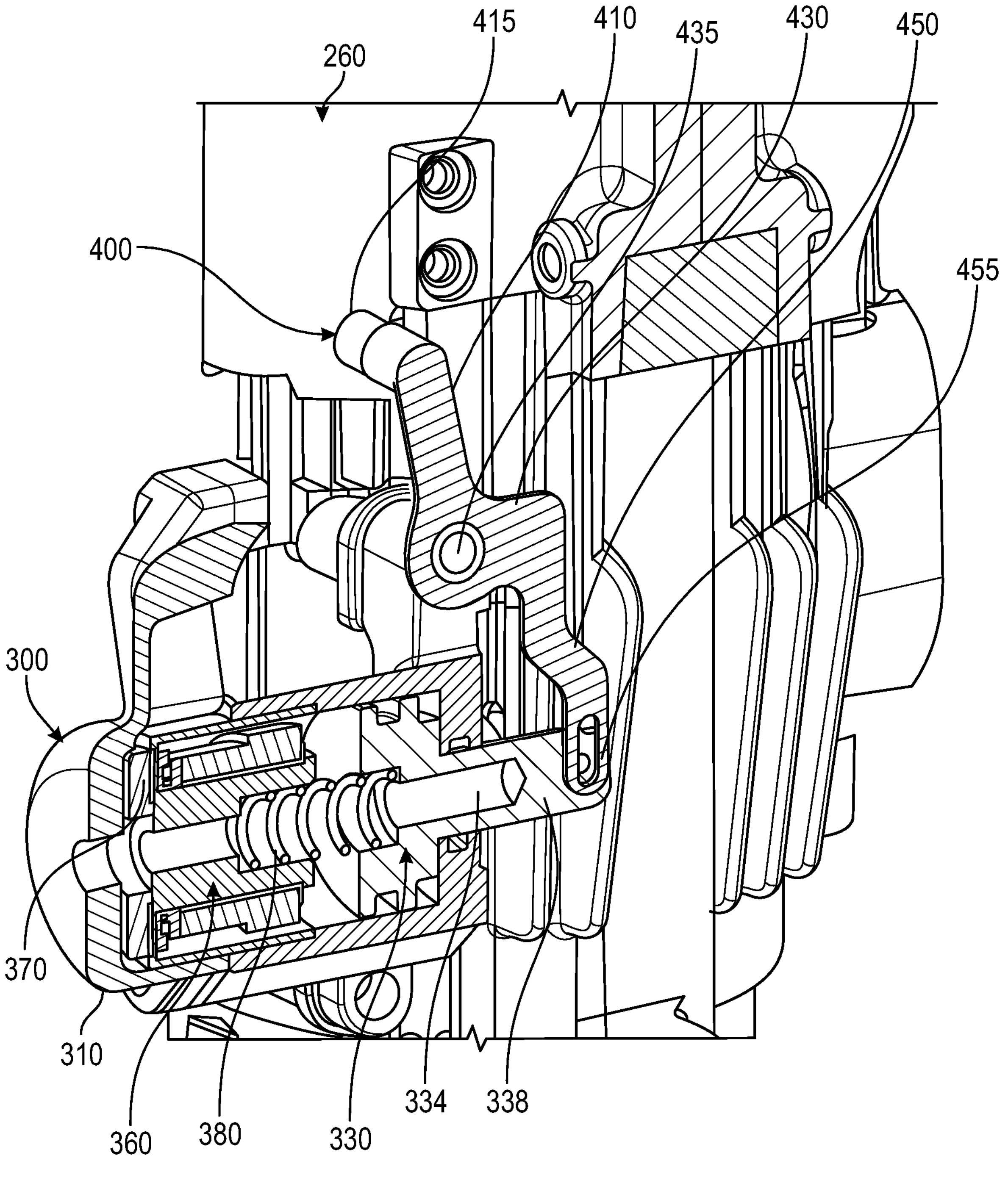

FIGS. 3A, 3B, and 3C show the tool 100 in a ready to fire state with the chamber member 260 in a sealed position, the piston 220 in a fully retracted position, and the chamber member retaining assembly 300 in the inactive state.

Figure 4B:
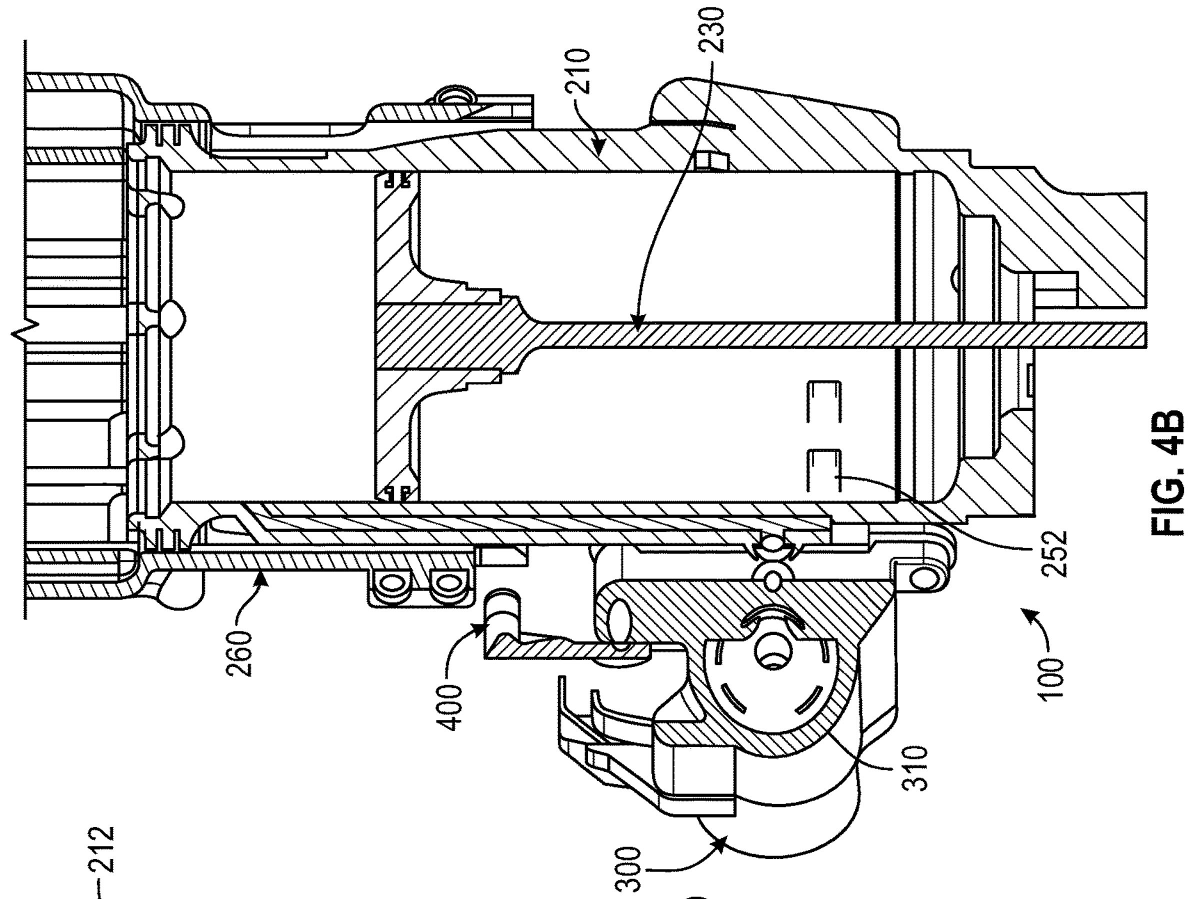
FIGS. 4A, 4B, and 4C are fragmentary partial cross-sectional views of the fastener-driving tool of FIG. 1 that is in a fired state with the chamber member in the sealed position, the piston in a partially driven position, and the chamber member retaining assembly in an active state with actuation member retained position, the electromagnet energized and retaining the actuation member in the retained position, and the chamber member engagement lever positioned to engage the chamber member.
Figure 4A:
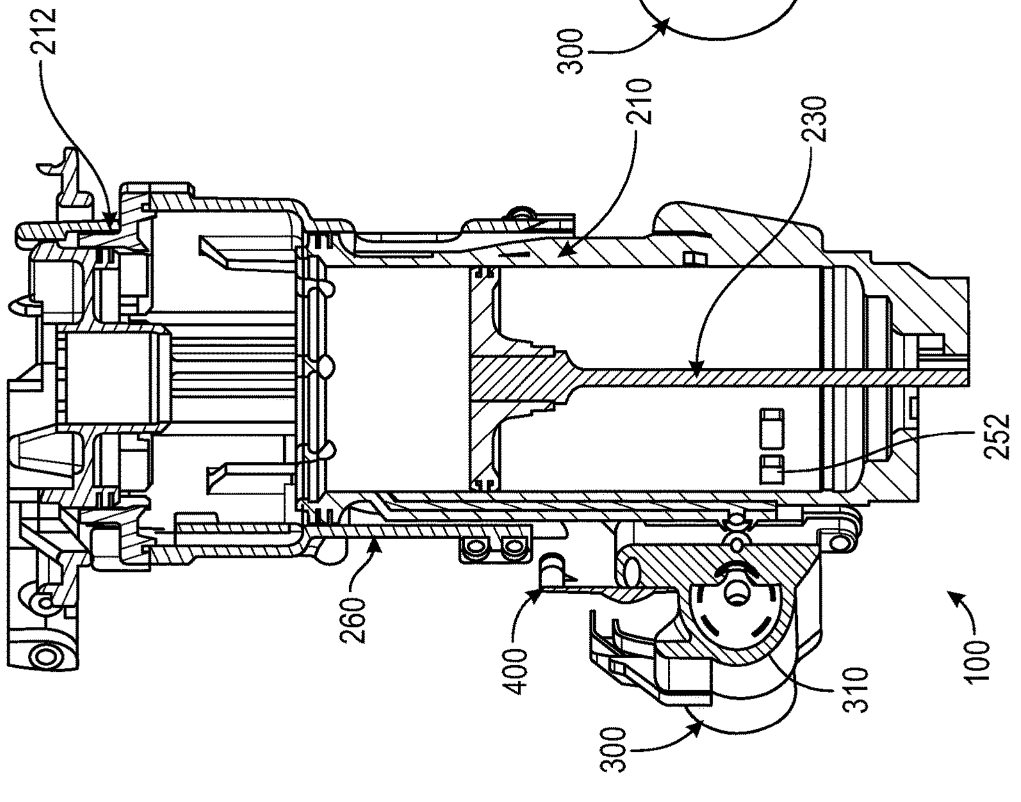
Figure 4C:
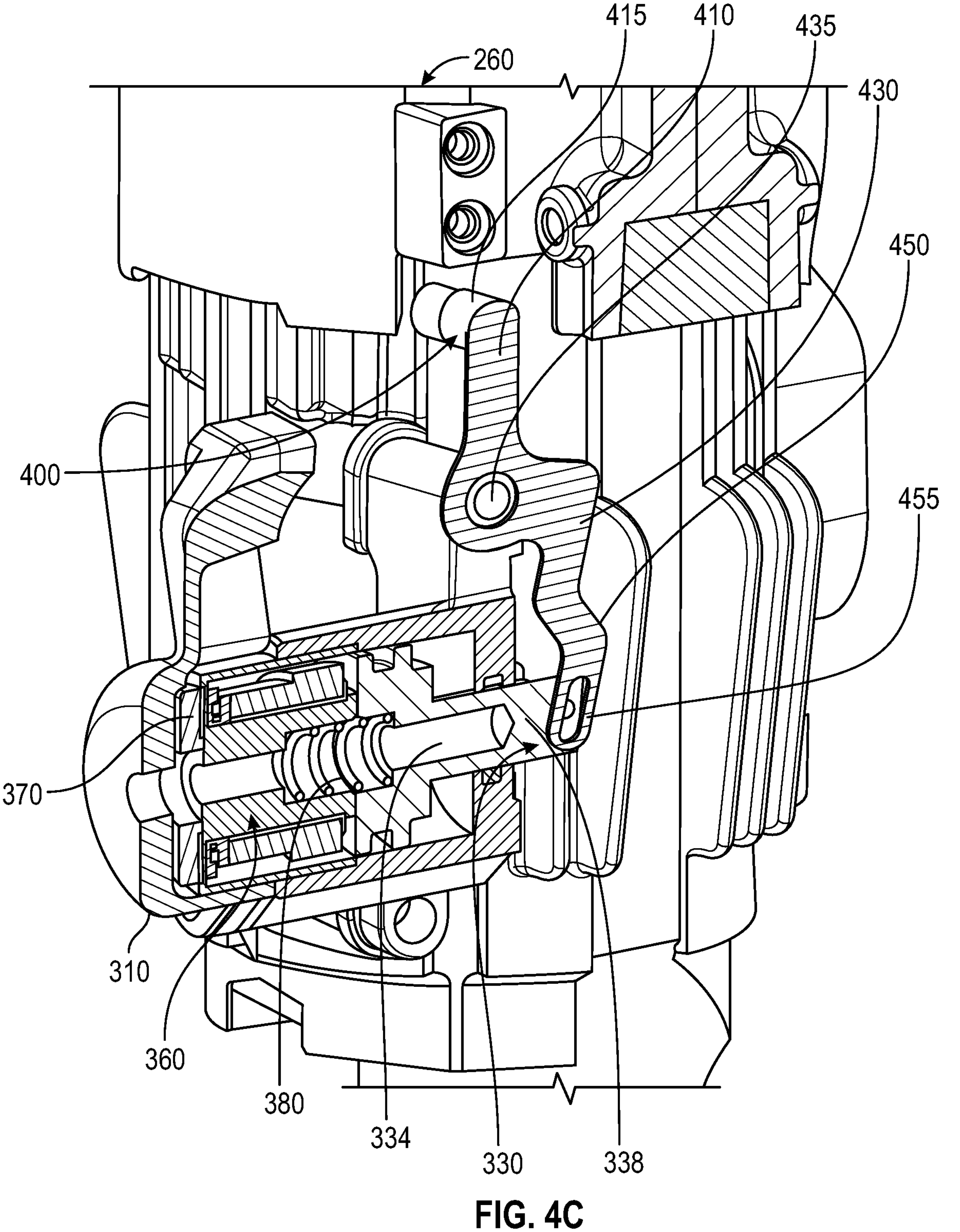

FIGS. 4A, 4B, and 4C show the tool 100 in a fired state with the chamber member 260 in the sealed position, the piston 220 in a partially driven position, and the chamber member retaining assembly 300 in an active state with actuation member 330 in a retained position (against the bias of the spring 380), the electromagnet 360 energized and retaining the actuation member 330 in the retained position, and the chamber member engagement lever 400 positioned to engage the chamber member 260. In this state, the actuation member 330 has caused the lower arm 450 of the chamber member engagement lever 400 to move toward the electromagnet 360, the entire chamber member engagement lever 400 to pivot about the pivot pin 435, and the upper arm 410 of the chamber member engagement lever 400 to pivot inwardly such that the chamber member engagement hand 415 of the chamber member engagement lever 400 can engage or be engaged by the chamber member 260 to prevent the chamber member 260 from moving to its unsealed position.

Figure 5B:
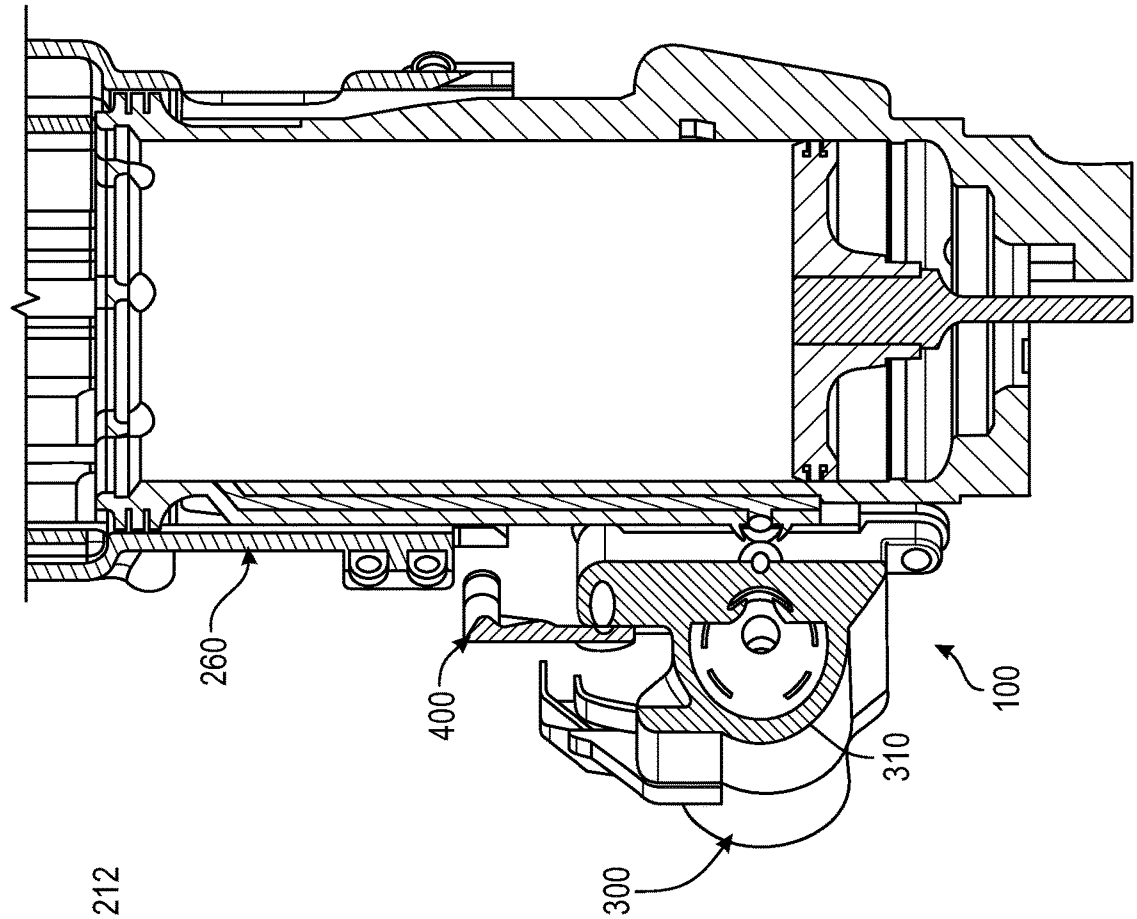
FIGS. 5A, 5B, and 5C are fragmentary partial cross-sectional views of the fastener-driving tool of FIG. 1 that is in a fired state with the chamber member in the sealed position, the piston is fully driven and starting to move back toward the retracted position, and the chamber member retaining assembly in the active state with actuation member in the retained position, the electromagnet energized and retaining the actuation member in the retained position, and the chamber member engagement lever positioned to engage the chamber member.
Figure 5A:
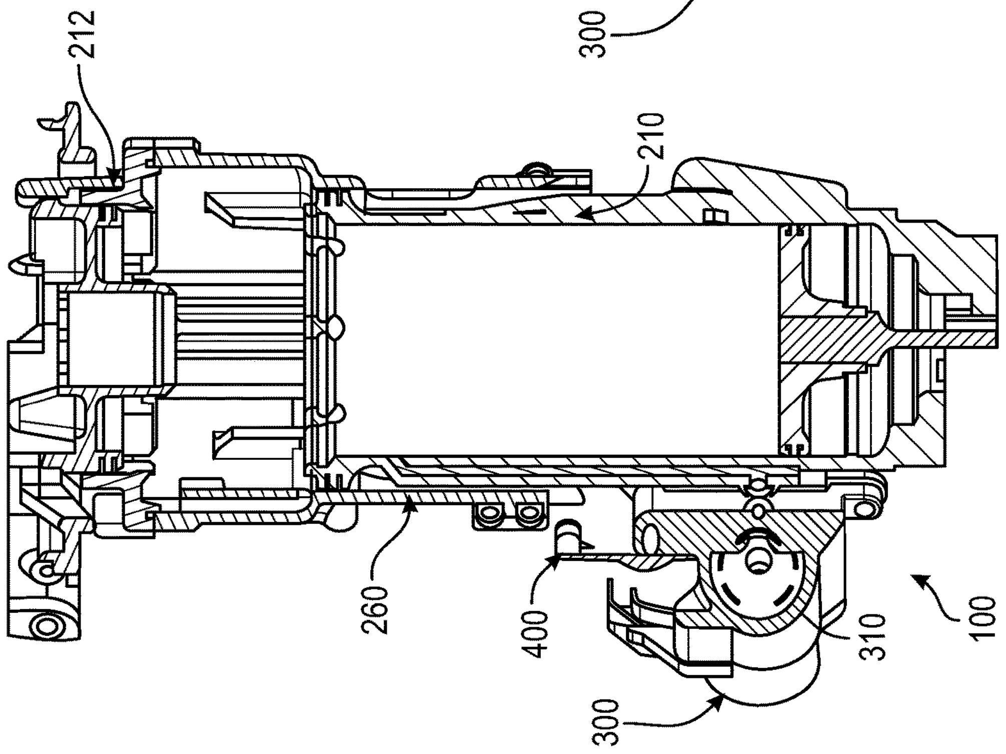
Figure 5C:
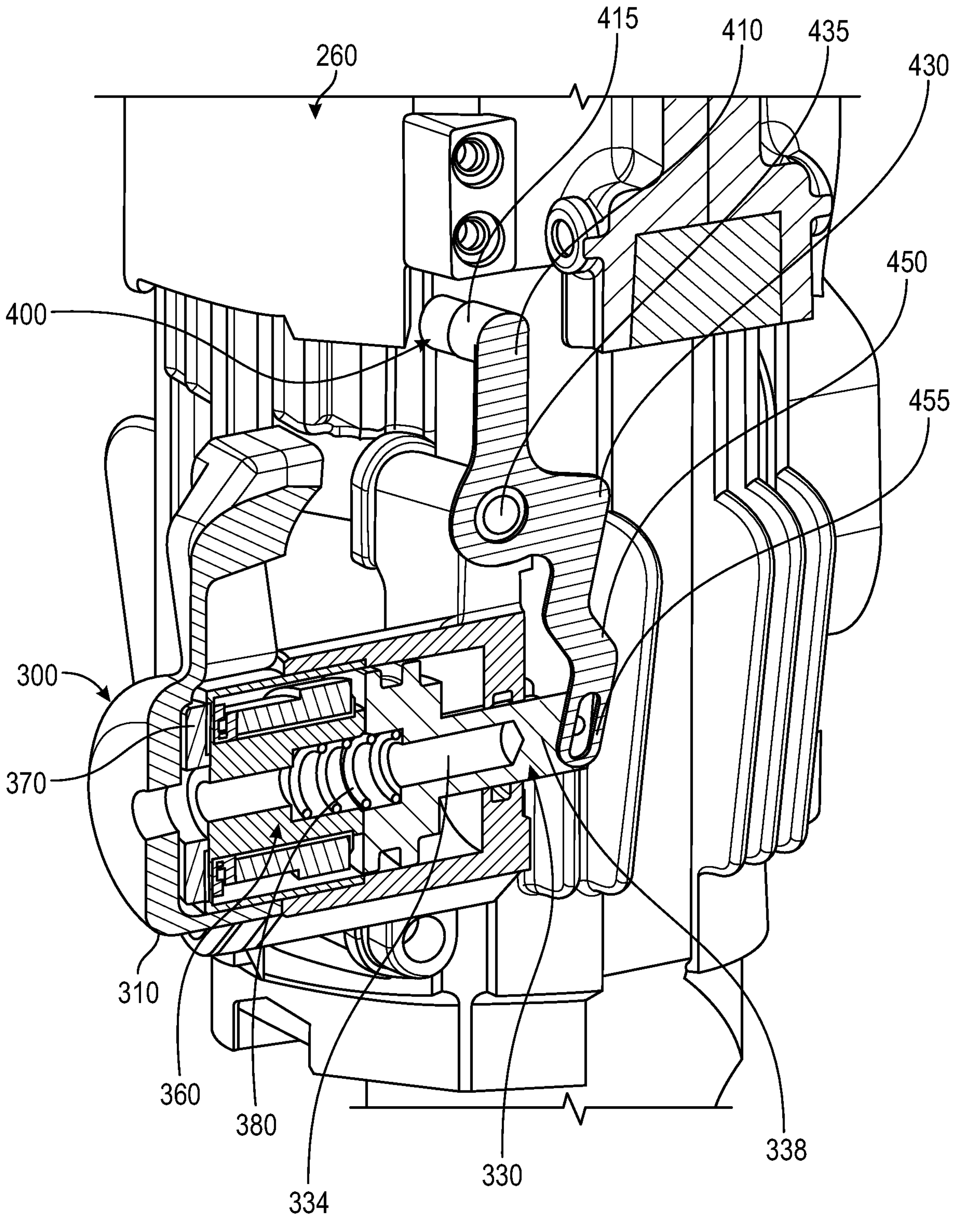

FIGS. 5A, 5B, and 5C show the tool 100 in a fired state with the chamber member 260 in the sealed position, the piston 220 in fully driven and starting to move back toward its retracted position, and the chamber member retaining assembly 300 in the active state with actuation member 330 in a retained position, the electromagnet 360 energized and retaining the actuation member 330 in the retained position, and the chamber member engagement hand 415 of the chamber member engagement lever 400 positioned to engage or be engaged by the chamber member 260.

Figure 6B:
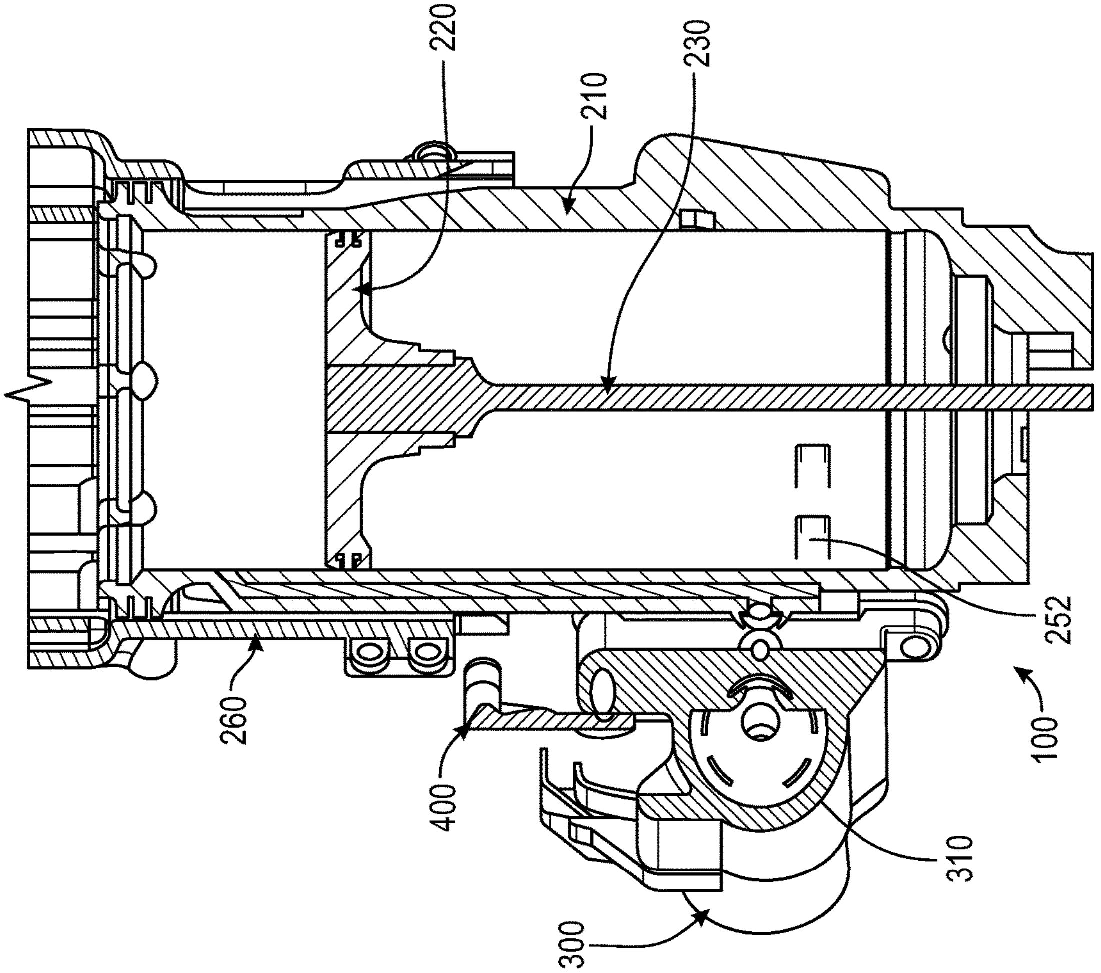
FIGS. 6A, 6B, and 6C are fragmentary partial cross-sectional views of the fastener-driving tool of FIG. 1 that is in a fired state with the chamber member still not moving (or substantially moving) from the sealed position, the piston moving back toward the fully retracted position, and the chamber member retaining assembly in the active state with actuation member in a retained position, the electromagnet energized and retaining the actuation member in the retained position, and the chamber member engagement lever engaging the chamber member to prevent movement of the chamber member.
Figure 6A:
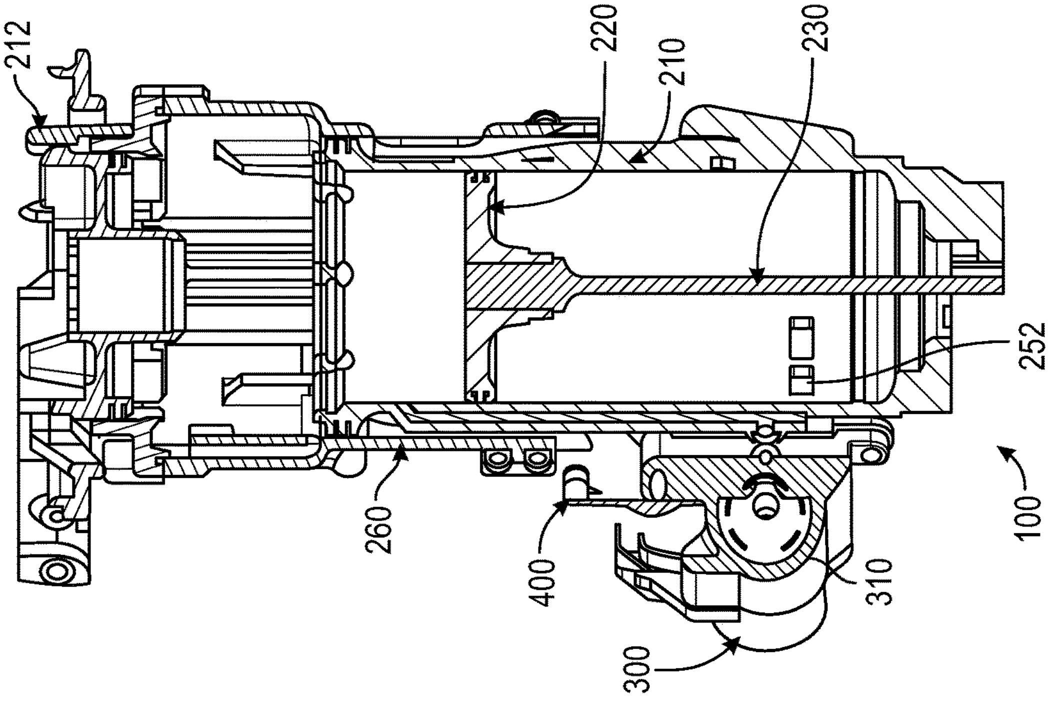
Figure 6C:
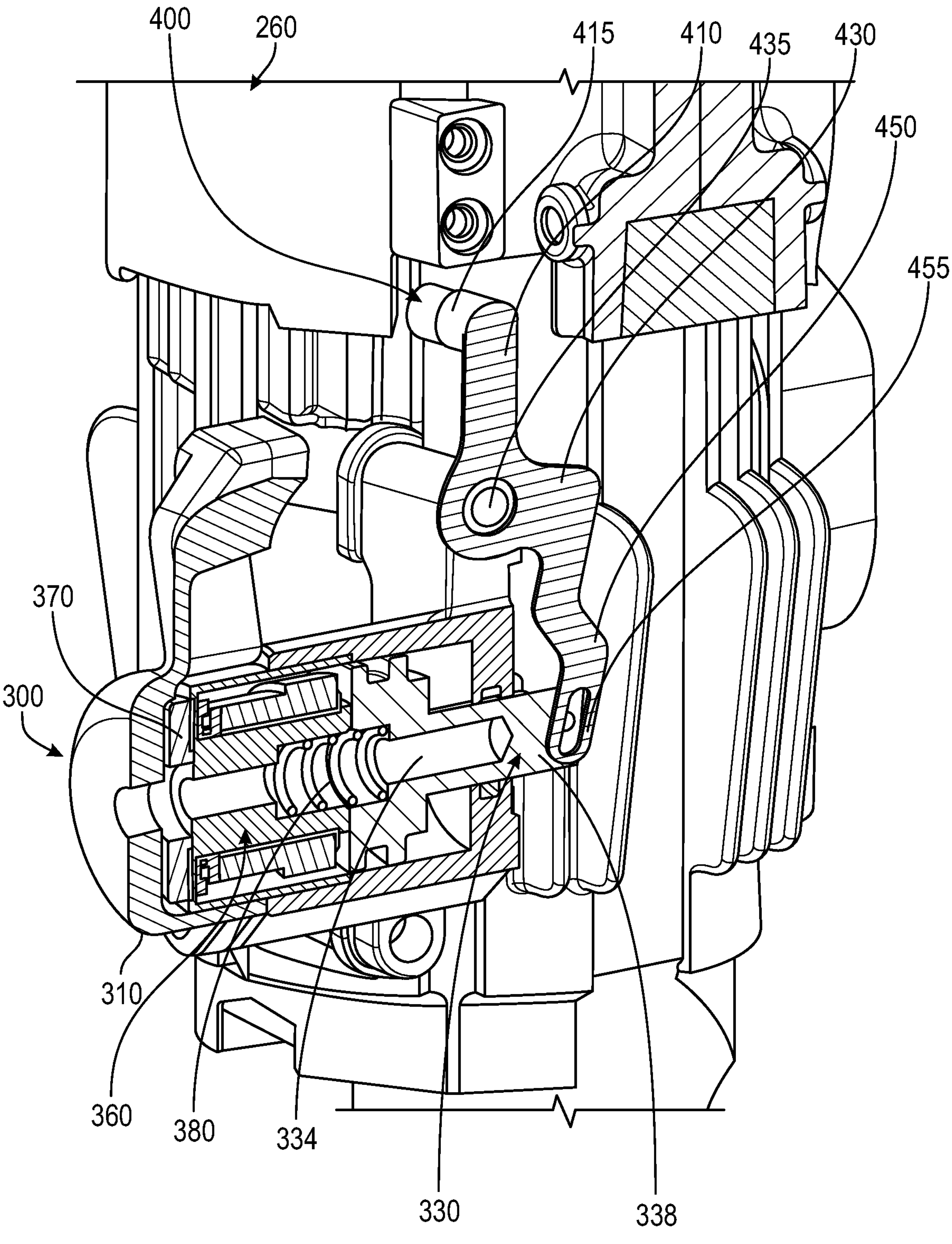

FIGS. 6A, 6B, and 6C show the tool 100 in a fired state with the chamber member 260 starting to move from the sealed position, the piston 220 moving back toward the fully retracted position, and the chamber member retaining assembly 300 in the active state with actuation member 330 in the retained position, the electromagnet 360 energized and retaining the actuation member 330 in the retained position, and the chamber member engagement hand 415 of the chamber member engagement lever 400 engaging or being engaged by the chamber member 260 to prevent further movement of the chamber member 260 until the piston 220 returns to its fully retracted position. After piston 220 has returned to its fully retracted position, the chamber member retaining assembly 300 will return to its inactive state such as shown in FIGS. 2A, 2B, 2C and 2D. To do so, the controller will cause the electromagnet 360 to be de-energized and thus release the actuation member 330 such that the spring 380 will cause the actuation member to return to its un-retained position. This will cause the lower arm 450 of the chamber member engagement lever 400 to move away from the electromagnet 360, the entire chamber member engagement lever 400 to pivot back about the pivot pin 435, and the upper arm 410 of the chamber member engagement lever 400 to pivot outwardly such that the chamber member engagement hand 415 of the chamber member engagement lever 400 is no longer in position to engage or be engaged by the chamber member 260 and thus allow the chamber member 260 to move to its unsealed position.

Figure 7A:
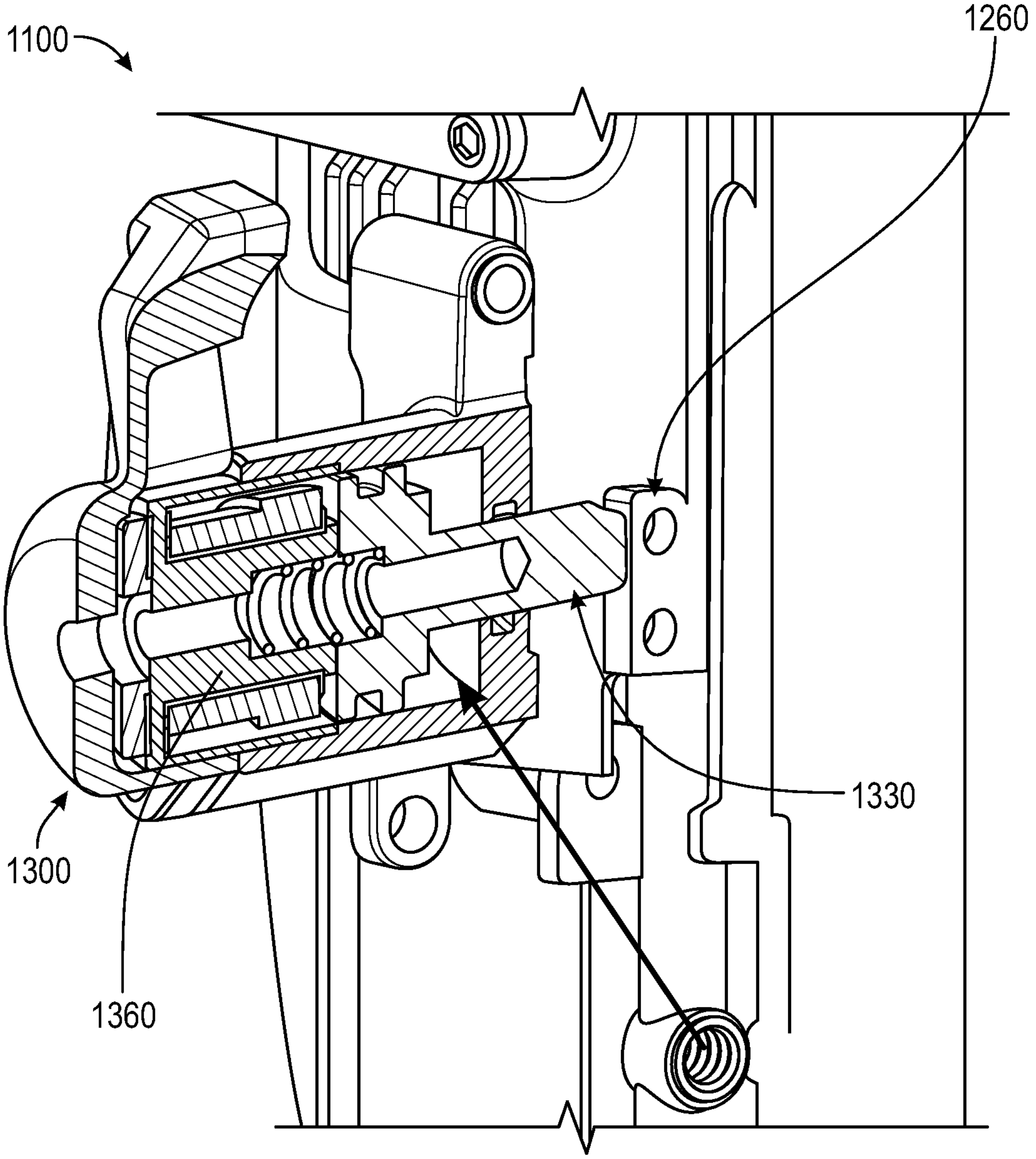
FIGS. 7A, 7B, and 7C are fragmentary partial cross-sectional views of part of a combustion-powered fastener-driving tool of another example embodiment of the present disclosure, wherein the chamber member retaining assembly does not include a chamber member engagement lever and the engagement of the chamber member is directly engaged by the actuation member.
Figure 7B:
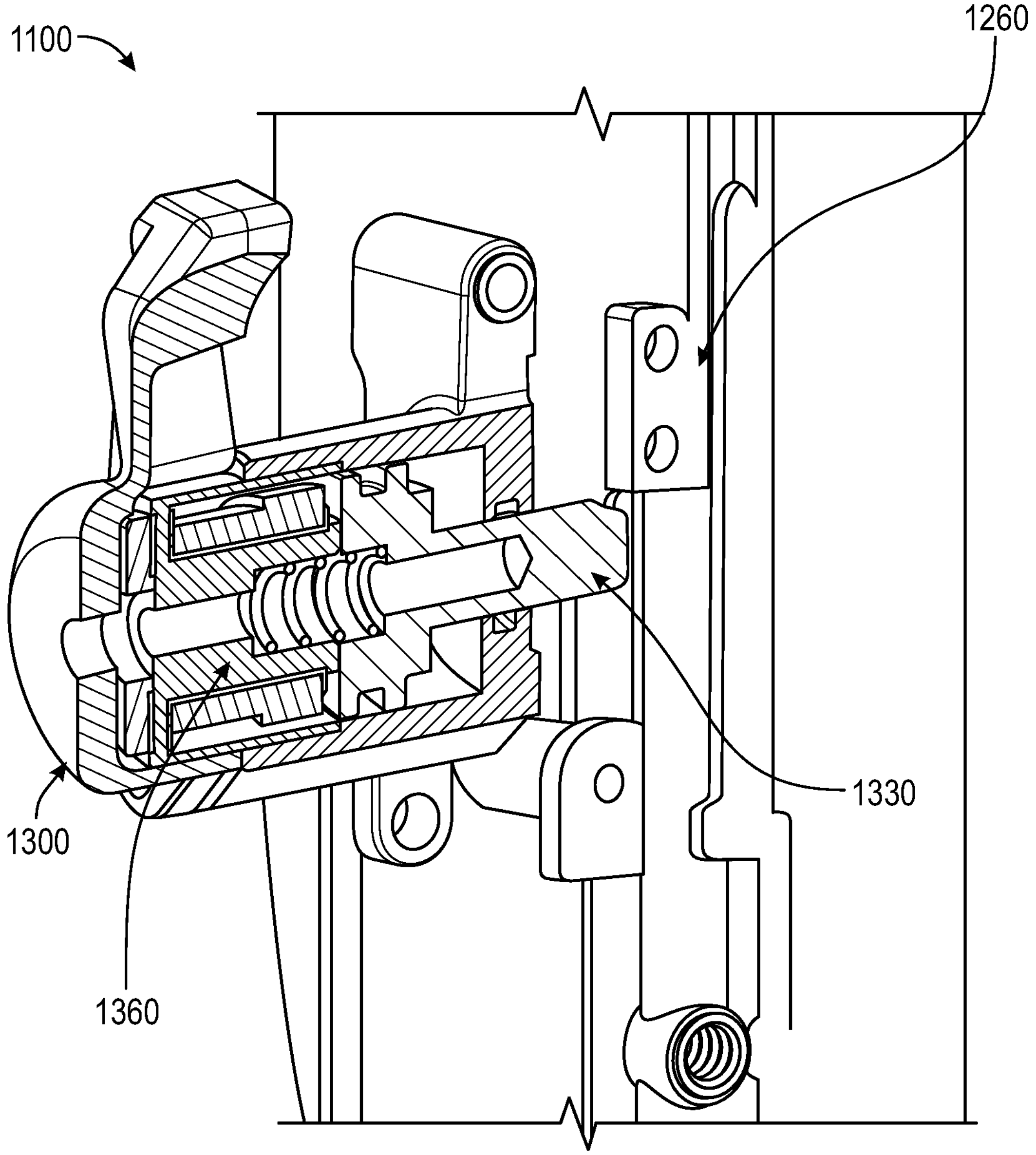
Figure 7C:
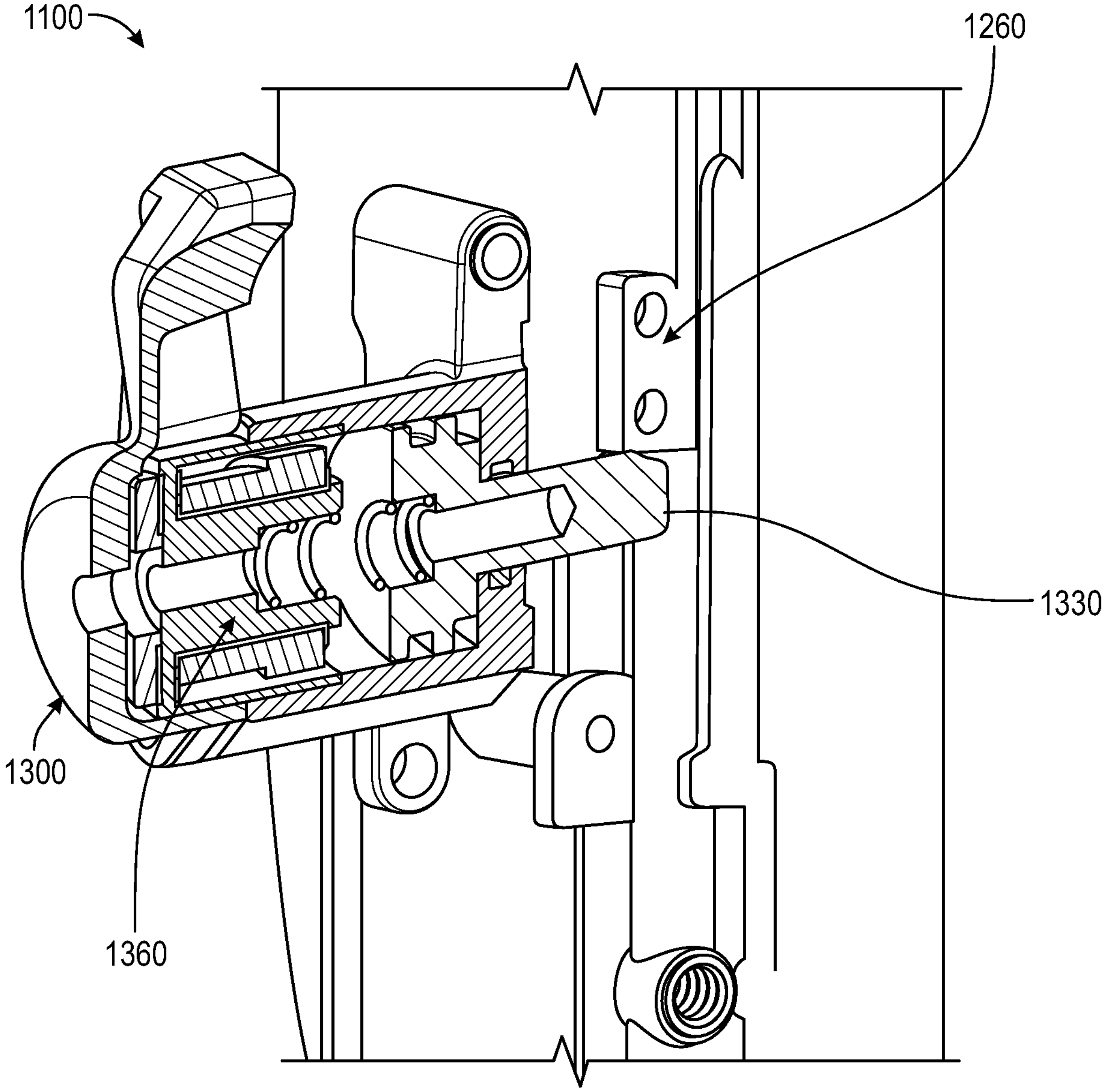

FIGS. 7A, 7B, and 7C are fragmentary partial cross-sectional views of certain components of another example embodiment of a combustion-powered fastener-driving tool 1100 of the present disclosure, wherein the chamber member retaining assembly 1300 does not include a chamber member engagement lever 400 and the engagement of the chamber member 1260 is directly by the actuation member 1330. In this example embodiment, the chamber member retaining assembly 1300 can include a solenoid or gas assisted actuation member 1330 and may include an electromagnet 1360 that holds the actuation member 1330 in a retained position. The tool 1100 causes the actuation member 1330 to move from an unretained position (FIG. 7C) to a retained position (FIGS. 7A and 7B). The controller (not shown) of the tool 1100 energizes the electromagnet 1360 to maintain the actuation member 1330 in the retained position (FIGS. 7A and 7B). In this embodiment, the actuation member 1330 directly prevents the chamber member 1260 from moving toward its unsealed position from its sealed position when the actuation member 1330 is in its unretained position (FIG. 7C). This operates in a reverse manner to the above embodiment. If this embodiment includes an electromagnet 1360, the controller can de-energize the electromagnet 1360 to cause the actuation member to engage the chamber member 1260 to prevent to give the piston 1220 time to fully return to its pre-firing position. If this embodiment includes a solenoid, the controller can energize the solenoid to cause the actuation member to engage the chamber member 1260 to prevent to give the piston 1220 time to fully return to its pre-firing position. If various such embodiments, the spring may be eliminated.

Figure 8A:
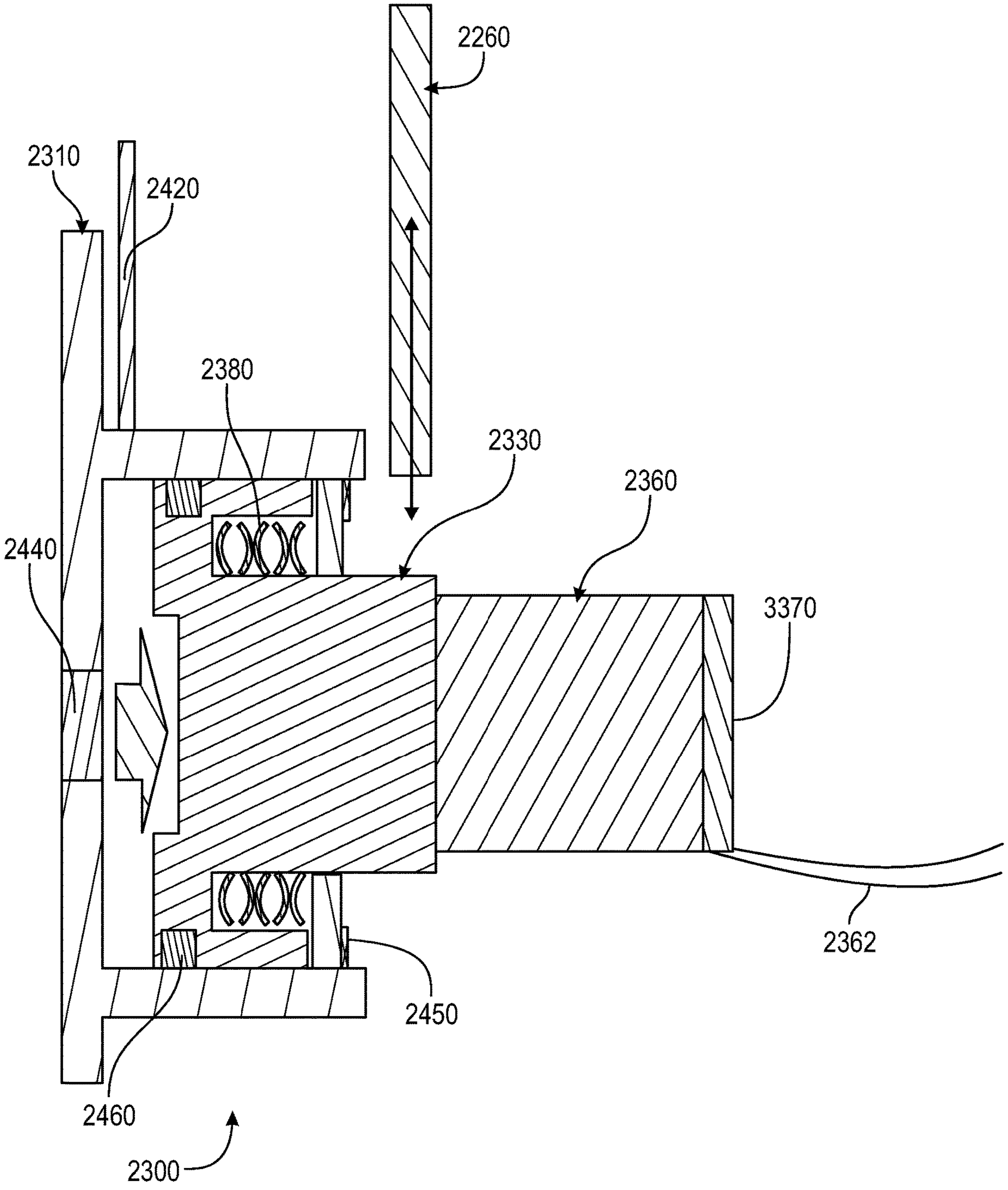
FIGS. 8A and 8B are diagrammatic views of a chamber member retaining assembly of a combustion-powered fastener-driving tool of another example embodiments of the present disclosure.
Figure 8B:
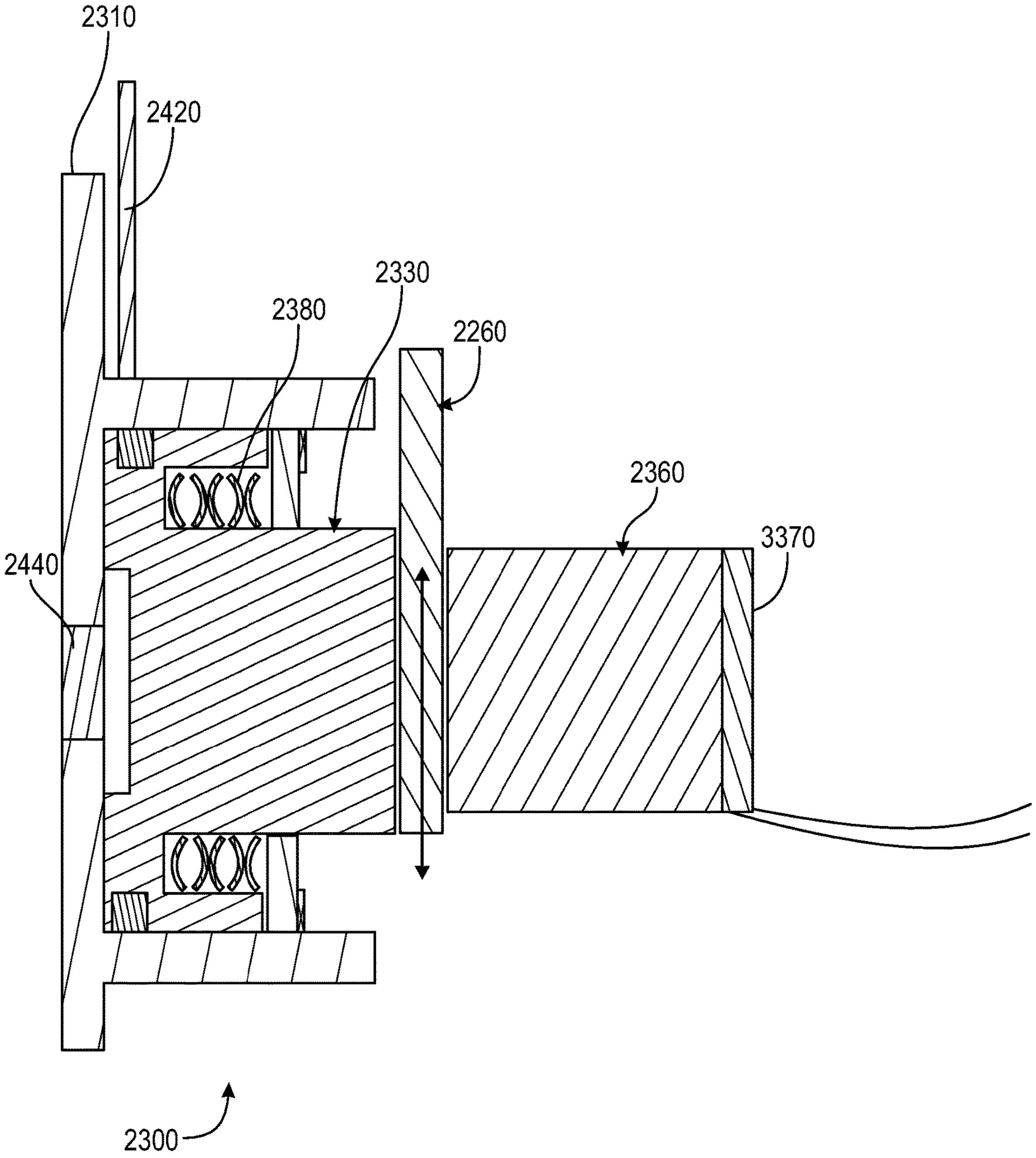

FIGS. 8A and 8B show another example embodiment of certain components of the chamber member retaining assembly 2300 of another example combustion-powered fastener-driving tool of the present disclosure. in this example embodiment, the actuation member 2330 is integrated into the engine sleeve 2310. In this example embodiment, the chamber member retaining assembly 2300 includes a gas assisted actuation member 2330 positioned in and movable in the engine sleeve 2310 and an electromagnet 2360 (and electric leads 2362 thereof) positioned adjacent to the actuation member 2330 and supported by the housing (not shown). The electromagnet 2360 is configured, under control of the controller (not shown) of the tool, to hold the actuation member 2330 position in a retained position shown in FIG. 8A. The chamber member retaining assembly 2300 further includes a gas pressure feed tube 2420 that is configured to supply gas to move the actuation member 2330 to the retained position. In certain embodiments this gas pressure feed tube 2420 is optional. The chamber member retaining assembly 2300 further includes a gas pressure inlet valve 2440 configured to enable combusted gas to move the actuation member 2330 to the retained position. The chamber member retaining assembly 2300 further includes a biasing member such as a wave spring 2380 configured to bias the actuation member 2330 to the un-retained position shown in FIG. 8B. The chamber member retaining assembly 2300 further includes a rubber bumper 370 that provides damping behind the electromagnet 3360. The chamber member retaining assembly 2300 further includes a retaining ring 2450 connected to the engine sleeve 2310 and configured to limit the outward movement of the actuation member 2330. The chamber member retaining assembly 2300 further includes one or more seals 2460 configured to provide a gas tight seal between the actuation member 2330 and the engine sleeve 2310. The chamber member retaining assembly 2300 further includes a spring retainer such as a stainless steel washer configured to retain the wave spring 2380. In this example embodiment, when chamber member retaining assembly 2300 is active, the actuation member 2330 is moved toward the electromagnet 2360, and the electromagnet 2360 holds the actuation member 2330 in a retained position to prevent downward movement of the chamber member or valve sleeve 2260 as shown in FIG. 8A. In this example embodiment, part of the chamber member or valve sleeve 2260 moves between the actuation member 2330 and the electromagnet 2360 when chamber member retaining assembly 2300 is not active as shown in FIG. 8B.

Figure 9C:
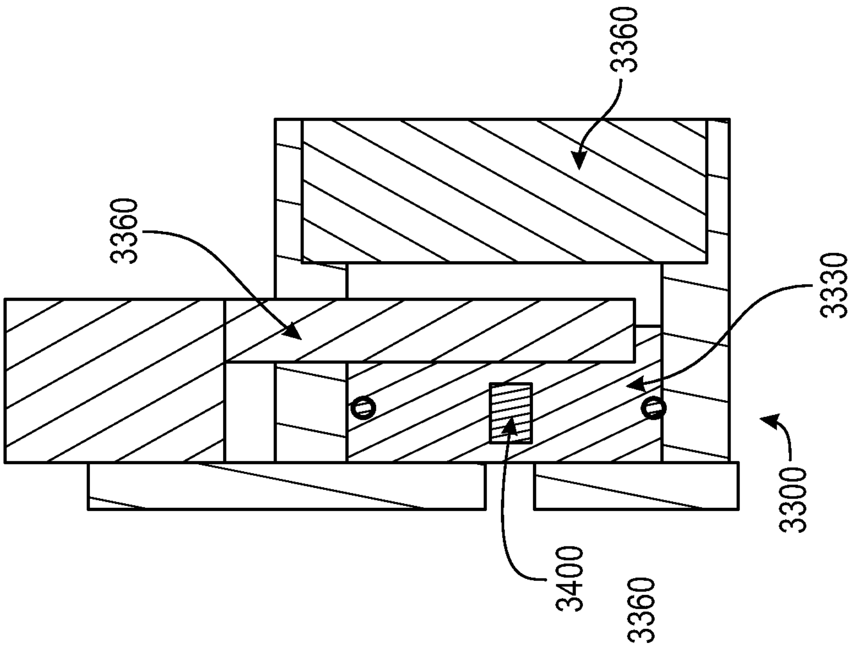
FIGS. 9A, 9B, and 9C are diagrammatic views of a chamber member retaining assembly of a combustion-powered fastener-driving tool of another example embodiment of the present disclosure.
Figure 9B:
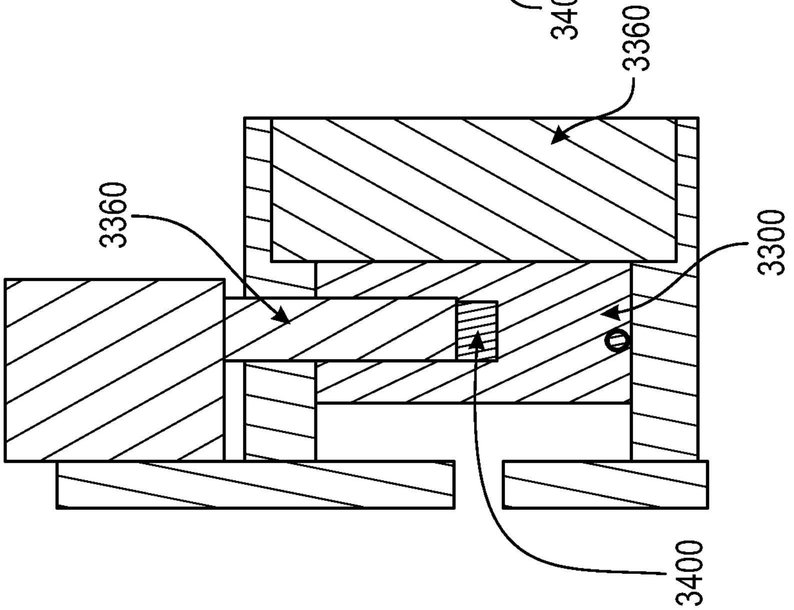
Figure 9A:
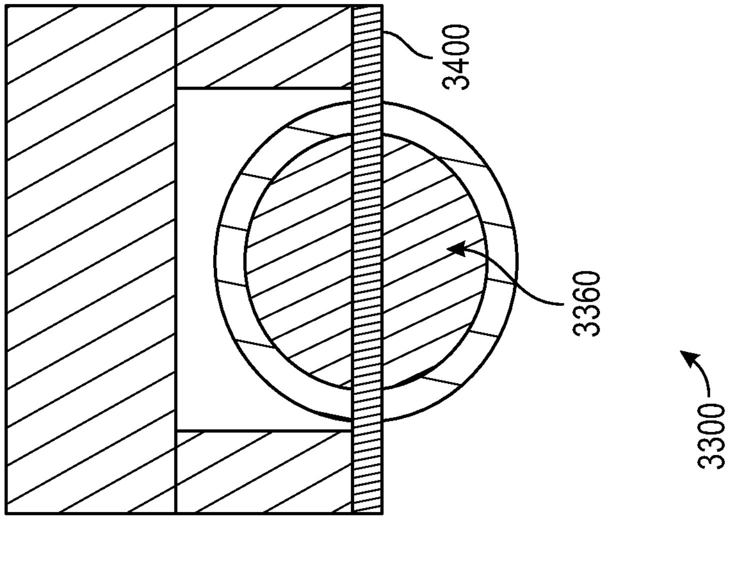

FIGS. 9A, 9B, and 9C show another example embodiment of certain components of the chamber member retaining assembly 3300 of another example combustion-powered fastener-driving tool of the present disclosure. In this example embodiment, the actuation member 3330 is moveable toward the electromagnet 3360, the electromagnet 3360 holds the actuation member 3330 in a position to prevent downward movement of the chamber member or valve sleeve 3260. In this example embodiment, the chamber member retaining assembly 3300 includes a lockout bar 3400 that is configured to engage one or multiple parts of the chamber member or valve sleeve 3260 when in the retained position as shown in 9B.

Figure 10A:
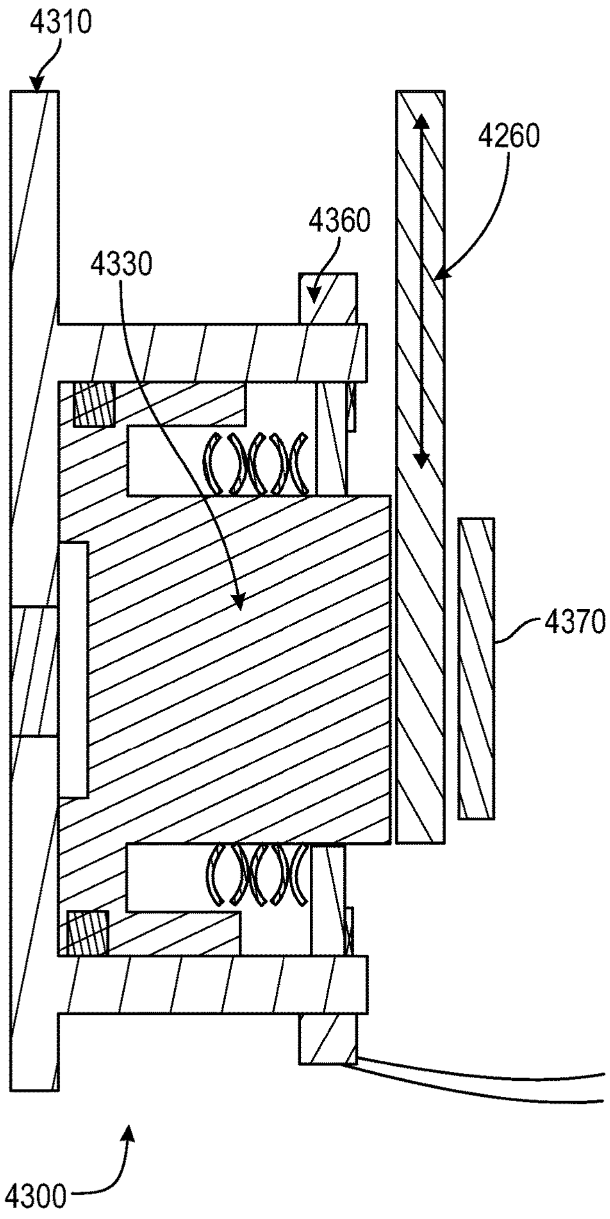
FIGS. 10A and 10B are diagrammatic views of a chamber member retaining assembly of a combustion-powered fastener-driving tool of another example embodiments of the present disclosure.
Figure 10B:
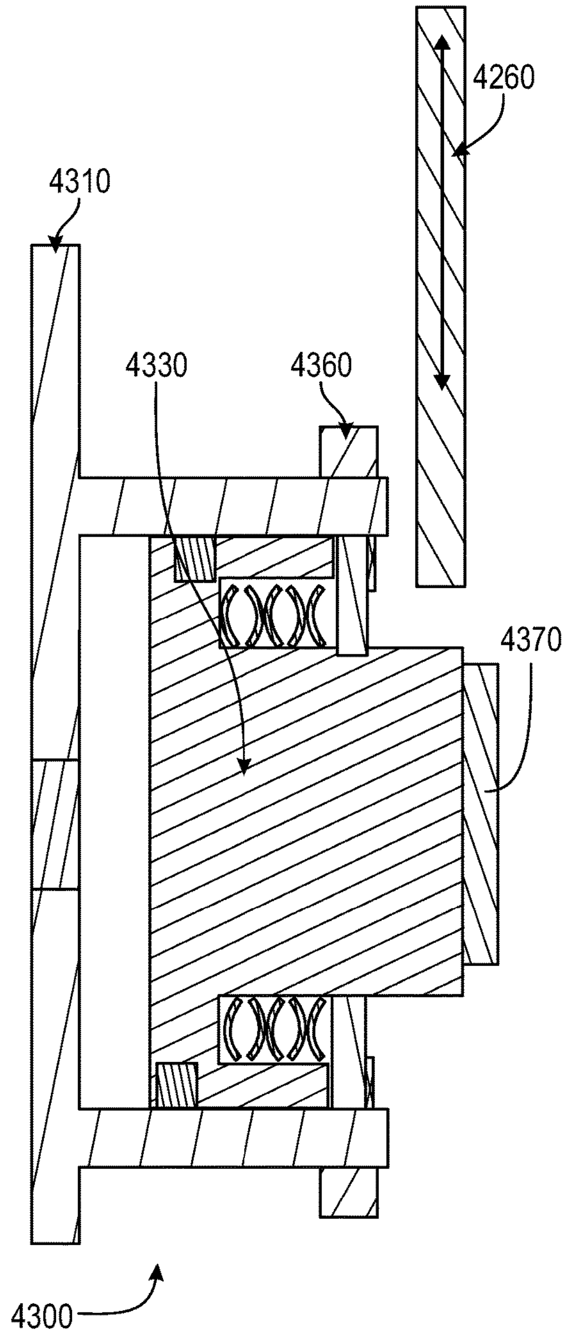
Figure 11B:
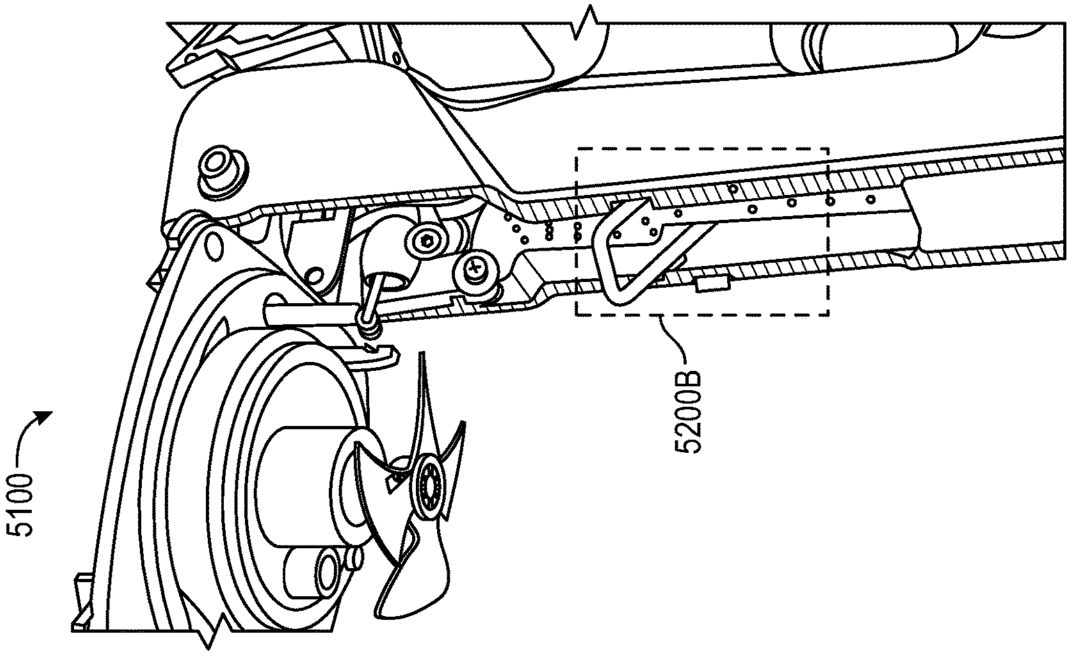
FIGS. 11A and 11B are fragmentary view of a part of a combustion-powered fastener-driving tool of another embodiment of the present disclosure and showing the potential locations of a chamber member retaining assembly thereof.

FIGS. 10A and 10B show another example embodiment of certain components of the chamber member retaining assembly 4300 of another example combustion-powered fastener-driving tool of the present disclosure. This example embodiment is somewhat similar to the embodiment of FIGS. 8A and 8B except that the electromagnet 4360 is relocated. In this example embodiment, the electromagnet 4360 is located entirely or partially around the actuation member 4330, but in a biased direction toward the chamber member 4260 when in the inactive state. In this example embodiment, the actuation member 4330 is integrated into the engine sleeve 4310. In this example embodiment, the electromagnet 4360 is located around the actuation member 4330 for compactness. In this example embodiment, the actuation member 4330 is moveable relative to the electromagnet 4360, the electromagnet 4360 holds the actuation member or piston 4330 in a position to prevent downward movement of the chamber member or valve 4260 sleeve as shown in FIG. 11B. This embodiment also takes advantage of a stronger magnetic field position (i.e., the actuation member 4330 operates closer to the center of the electromagnet 4360 for less drop off in force). In this example embodiment, part of the chamber member or valve sleeve 4260 moves between the actuation member 4330 and the bumper 4370 of the chamber member retaining assembly 4300 when not active as shown in FIG. 11A.

Figure 11A:
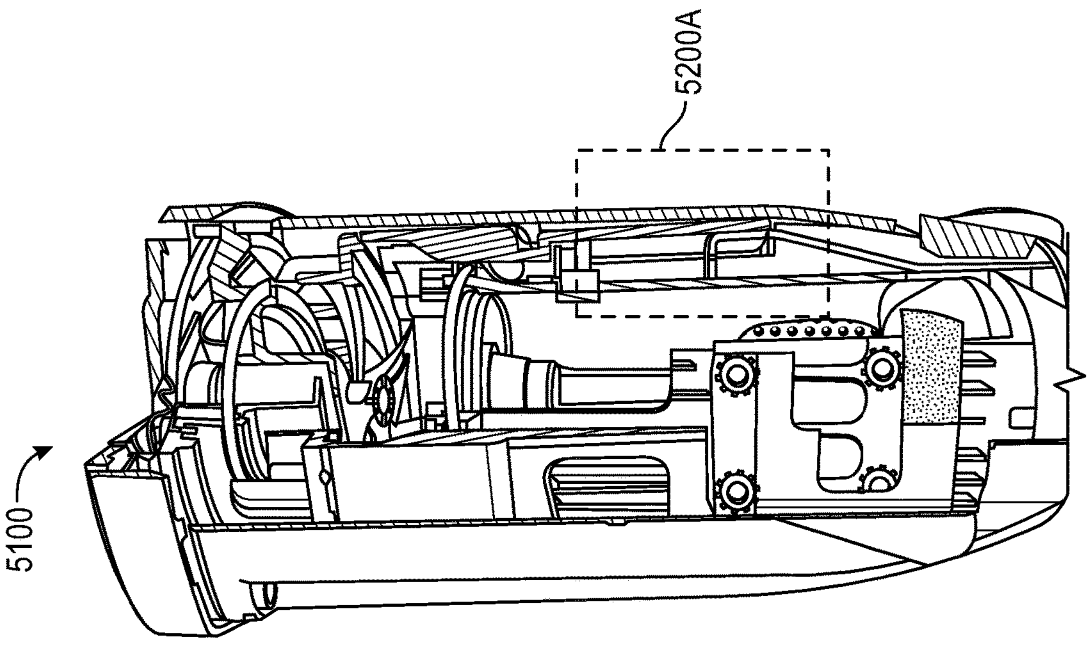

FIGS. 11A and 11B show an example combustion-powered fastener-driving tool 5100 showing in the phantom boxes indicated by numerals 5200A and 5300B the potential locations of a chamber member retaining assembly 5300 of the present disclosure.

Figure 12A:
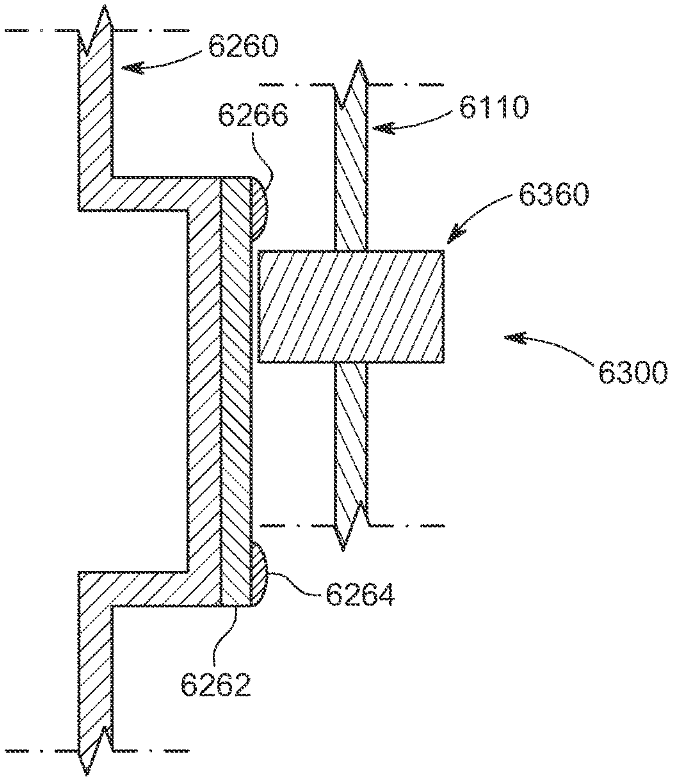
FIGS. 12A and 12B are fragmentary view of a part of a combustion-powered fastener-driving tool of another embodiment of the present disclosure and showing the chamber member retaining assembly thereof.
Figure 12B:
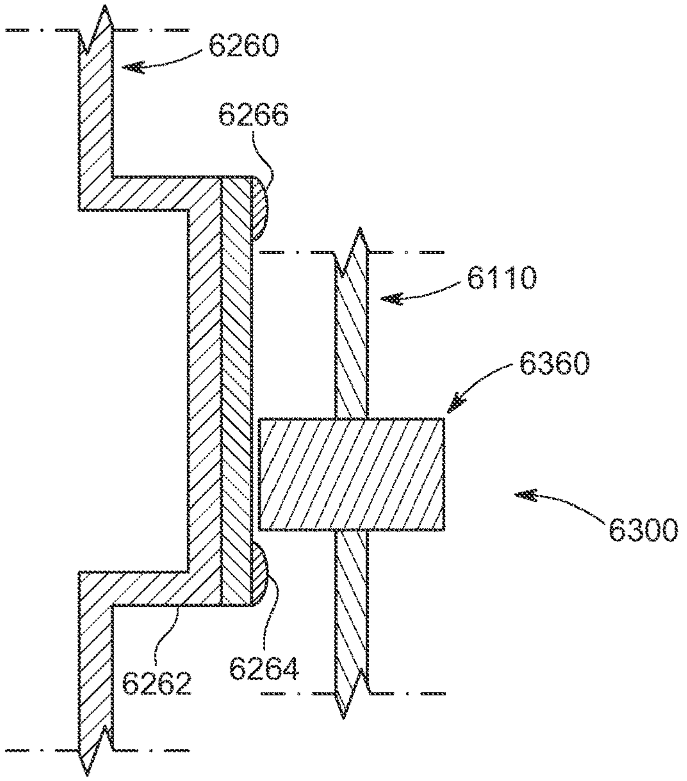

FIGS. 12A and 12B show another example embodiment of certain components of the chamber member retaining assembly 6300 of another example combustion-powered fastener-driving tool of the present disclosure. In this example embodiment, the electromagnet 6360 is configured to directly engage the chamber member 6260 to maintain the chamber member in the retained position. In this example embodiment, the electromagnet 6360 holds the chamber member or valve 6260 in the retained (upper) position as shown in FIG. 12B, and can release the chamber member or valve 6260 into an unretained (lower) position as shown in FIG. 12A. This embodiment also takes advantage of a strong magnetic field position because the forces of the electromagnet 6360 directly act on the chamber member 6260.

More specifically, in this example embodiment, the electromagnet 6260 is supported by a wall 6110 of the housing (not shown) of the tool in a fixed position transverse to the movement of the chamber member 6260. This transverse position of the electromagnet 6260 maximizes the time that the electromagnet 6260 can retain the chamber member 6260 in the retained position during the piston movement. In this example embodiment, a steel magnetic or electromagnet interface plate 6262 is connected to a wall of the chamber member 6260 by two fasteners 6264 and 6266 to enhance the interaction between the chamber member 6260 and the electromagnet 6260. Thus, the electromagnet 6260 can, under control of a controller of the tool, delay the return of the chamber member 6260 until the piston returns to its starting position. This device also semi-automates the return part of the chamber member 6260 movement under control of the controller.

Figure 13A:
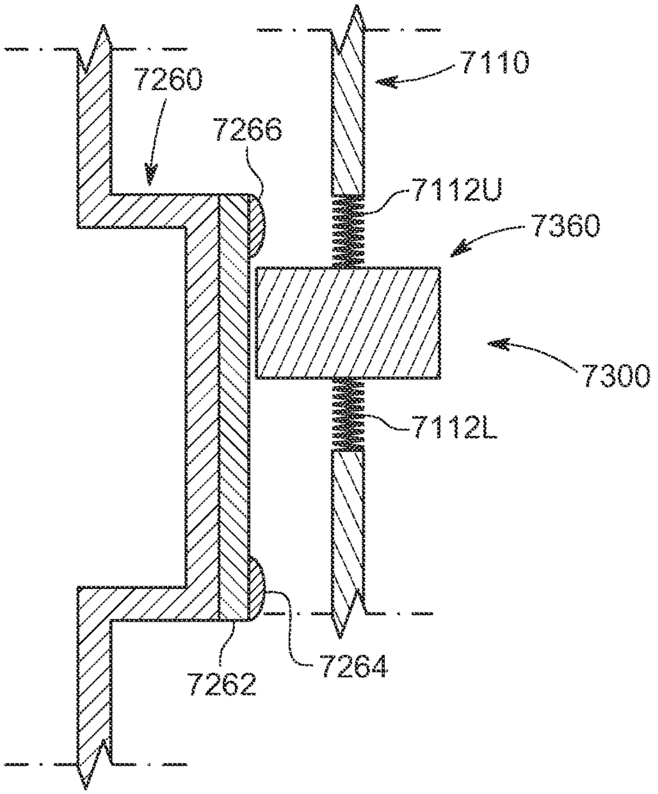
FIGS. 13A and 13B are fragmentary view of a part of a combustion-powered fastener-driving tool of another embodiment of the present disclosure and showing the chamber member retaining assembly thereof.
Figure 13B:
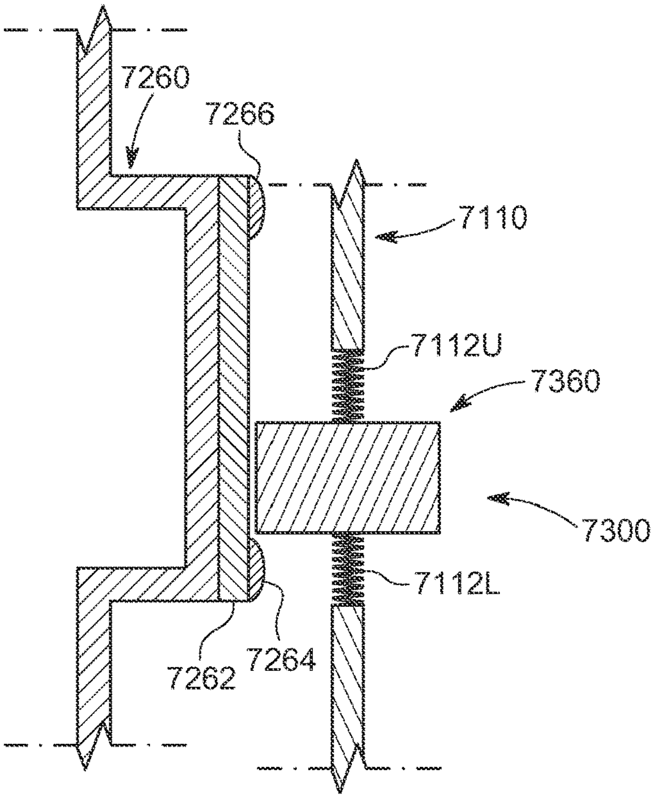

FIGS. 13A and 13B show another example embodiment of certain components of the chamber member retaining assembly 7300 of another example combustion-powered fastener-driving tool of the present disclosure. In this example embodiment, the electromagnet 7360 is configured to directly engage the chamber member 7260 to maintain the chamber member in the retained position. In this example embodiment, the electromagnet 7360 holds the chamber member or valve 7260 in the retained (upper) position as shown in FIG. 13B, and can release the chamber member or valve 7260 into an unretained (lower) position as shown in FIG. 13A. This embodiment also takes advantage of a strong magnetic field position because the forces of the electromagnet 7360 directly act on the chamber member 7260.

More specifically, in this example embodiment, the electromagnet 7260 is supported by a wall 6110 of the housing (not shown) of the tool and one or more biasing members (such as the upper biasing member 7112U and lower biasing member 7112L) in a moveable position transverse to the movement of the chamber member 7260. These transverse positions of the electromagnet 7260 maximize the time that the electromagnet 7260 can retain the chamber member 7260 in the retained position during the piston movement. In this example embodiment, a steel magnetic or electromagnet interface plate 7262 is connected to a wall of the chamber member 7260 by two fasteners 7264 and 7266 to enhance the interaction between the chamber member 7260 and the electromagnet 7260. Thus, the electromagnet 7260 can, under control of a controller of the tool, delay the return of the chamber member 7260 until the piston returns to its starting position. This device also semi-automates the return part of the chamber member 7260 movement under control of the controller.

Figure 14A:
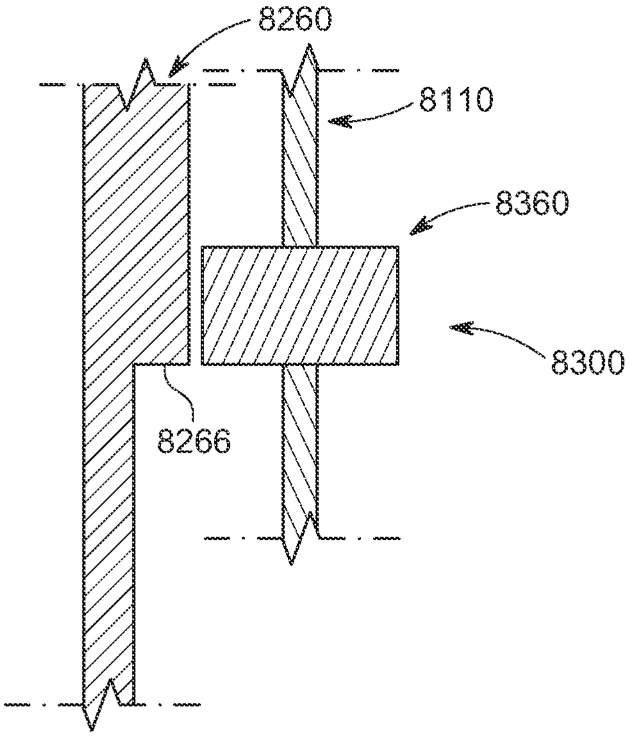
FIGS. 14A and 14B are fragmentary view of a part of a combustion-powered fastener-driving tool of another embodiment of the present disclosure and showing the chamber member retaining assembly thereof.
Figure 14B:
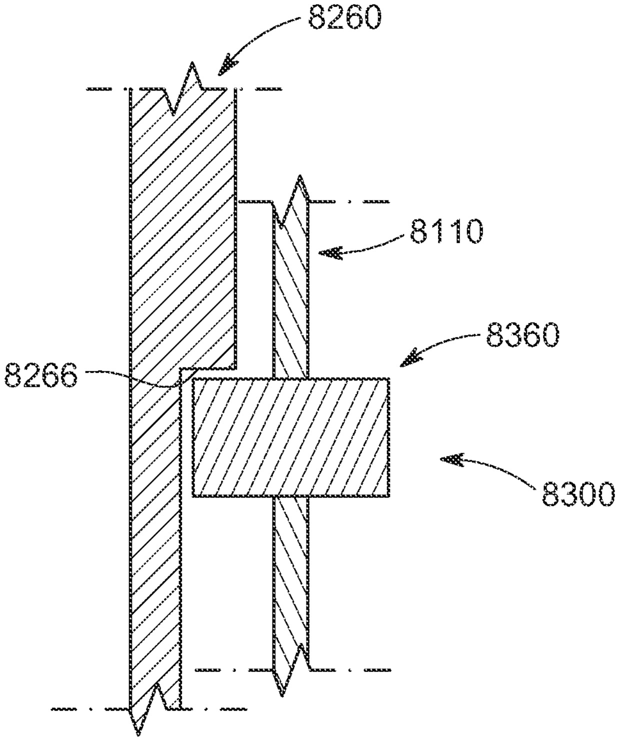

FIGS. 14A and 14B show another example embodiment of certain components of the chamber member retaining assembly 8300 of another example combustion-powered fastener-driving tool of the present disclosure. In this example embodiment, the electromagnet 8360 is configured to directly engage the chamber member 8260 to maintain the chamber member in the retained position. In this example embodiment, the electromagnet 8360 holds the chamber member or valve 8260 in the retained (upper) position as shown in FIG. 14B, and can release the chamber member or valve 8260 into an unretained (lower) position as shown in FIG. 14A. This embodiment also takes advantage of a strong magnetic field position because the forces of the electromagnet 8360 directly act on the chamber member 8260.

More specifically, in this example embodiment, the electromagnet 8260 is supported by a wall 8110 of the housing (not shown) of the tool in a fixed position transverse to the movement of the chamber member 8260. This transverse position of the electromagnet 8360 maximizes the time that the electromagnet 8360 can retain the chamber member 8260 in the retained position during the piston movement.

In this example embodiment, the wall of the chamber member 8260 is configured with a step 8266 for enhancing the interaction between the chamber member 8260 and the electromagnet 8360 in the retained position as shown in FIG. 14B. The step 8266 can be configured in any suitable manner. A suitable spring (not shown) can be employed with this example embodiment to cause engagement or release of the chamber member 8260. Thus, the electromagnet 8360 can, under control of a controller of the tool, delay the return of the chamber member 8260 until the piston returns to its starting position. This device also semi-automates the return part of the chamber member 8260 movement under control of the controller.

Various modifications to the above-described embodiments will be apparent to those skilled in the art. These modifications can be made without departing from the spirit and scope of this present subject matter and without diminishing its intended advantages. Not all of the depicted components described in this disclosure may be required, and some implementations may include additional, different, or fewer components as compared to those described herein. Variations in the arrangement and type of the components; the shapes, sizes, and materials of the components; and the manners of attachment and connections of the components may be made without departing from the spirit or scope of the claims set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The invention claimed is:

1. A combustion-powered fastener-driving tool comprising:
- a housing;
- a controller supported by the housing;
- a chamber member supported by the housing and movable relative to the housing from an unsealed position at which the chamber member does not seal a combustion chamber to a sealed position at which the chamber member seals the combustion chamber;
- a trigger supported by the housing and movable between an extended position and a retracted position; and
- a chamber member retaining assembly supported by the housing and including:
  - a steel interface plate connected to a wall of the chamber member,
  - an electromagnet controlled by the controller and activable to directly act on the steel interface plate to maintain the chamber member from moving from the sealed position to the unsealed position,
  - a first biasing member positioned adjacent to a first side of the electromagnet, the first biasing member configured to bias the electromagnet in a first direction, and
  - a second biasing member positioned adjacent to an opposite second side of the electromagnet, the second biasing member configured to bias the electromagnet in a second direction that is opposite the first direction.

2. The combustion-powered fastener-driving tool of claim 1, wherein the controller is configured to cause the electromagnet to be energized for a designated amount of time to maintain the chamber member in the sealed position to provide sufficient time for a piston supported by the housing to return to a pre-firing position.

3. The combustion-powered fastener-driving tool of claim 1, wherein the sealed position of the chamber member is closer to the electromagnet than unsealed position of the chamber member.

4. The combustion-powered fastener-driving tool of claim 1, wherein the electromagnet extends at least partially around the chamber member.

5. A combustion-powered fastener-driving tool comprising:
- a housing;
- a controller supported by the housing;
- a combustion chamber supported by the housing;
- a chamber member supported by the housing and movable:
  - (a) in a first direction relative to the housing from an unsealed position at which the chamber member does not seal the combustion chamber, and
  - (b) in a second direction that is opposite the first direction to a sealed position at which the chamber member seals the combustion chamber;
- a trigger supported by the housing and movable between an extended position and a retracted position; and
- a chamber member retaining assembly supported by the housing and including:
  - an electromagnet controlled by the controller and activable to maintain the chamber member in the sealed position,
  - the electromagnet moveable in the first direction,
  - the electromagnet moveable in the second direction,
  - a first biasing member positioned adjacent to a first side of the electromagnet, the first biasing member configured to bias the electromagnet, and
  - a second biasing member positioned adjacent to an opposite second side of the electromagnet, the second biasing member configured to bias the electromagnet.

6. The combustion-powered fastener-driving tool of claim 5, wherein the controller is configured to cause the electromagnet to be energized for a designated amount of time to maintain the chamber member in the sealed position to provide sufficient time for a piston supported by the housing to return to a pre-firing position.

* * * * *